US009613639B2

(12) United States Patent
Adachi et al.

(10) Patent No.: US 9,613,639 B2
(45) Date of Patent: Apr. 4, 2017

(54) COMMUNICATION SYSTEM AND TERMINAL DEVICE

(71) Applicant: ADC TECHNOLOGY INC., Aichi (JP)

(72) Inventors: Tsutomu Adachi, Aichi (JP); Tomoyoshi Yokoi, Aichi (JP); Shigeru Hayashi, Aichi (JP); Takezumi Kondo, Aichi (JP); Tatsumi Kuroda, Aichi (JP); Daisuke Mouri, Aichi (JP); Takeo Nozawa, Aichi (JP); Kenshi Takenaka, Aichi (JP); Hiroshi Maekawa, Aichi (JP); Tsuyoshi Kawanishi, Aichi (JP)

(73) Assignee: ADC TECHNOLOGY INC., Aichi (JP)

( * ) Notice: Subject to any disclaimer, the term of this patent is extended or adjusted under 35 U.S.C. 154(b) by 0 days.

(21) Appl. No.: 14/365,075

(22) PCT Filed: Dec. 14, 2012

(86) PCT No.: PCT/JP2012/082533
§ 371 (c)(1),
(2) Date: Jun. 12, 2014

(87) PCT Pub. No.: WO2013/089236
PCT Pub. Date: Jun. 20, 2013

(65) Prior Publication Data
US 2014/0303966 A1 Oct. 9, 2014

(30) Foreign Application Priority Data

Dec. 14, 2011 (JP) .................................. 2011-273578
Dec. 14, 2011 (JP) .................................. 2011-273579
(Continued)

(51) Int. Cl.
*G10L 19/00* (2013.01)
*G10L 25/72* (2013.01)
(Continued)

(52) U.S. Cl.
CPC ........... *G10L 25/72* (2013.01); *H04M 1/6075* (2013.01); *H04M 1/72572* (2013.01)

(58) Field of Classification Search
USPC ........................................ 704/201, 227, 228
See application file for complete search history.

(56) References Cited

U.S. PATENT DOCUMENTS 7,873,349 B1 * 1/2011 Smith ............... H04M 1/72577
455/410
2002/0087555 A1 * 7/2002 Murata ........................... 707/10
(Continued)

FOREIGN PATENT DOCUMENTS

JP  2001142487 A  5/2001
JP  2002232576 A  8/2002
(Continued)

OTHER PUBLICATIONS

Notification of Transmittal of Translation of the IPRP (PCT/IB/338), IPRP (PCT/IB/373) and Translation of the Written Opinion of the International Searching Authority (PCT/ISA/237) for PCT/JP2012/082533 dated Jun. 26, 2014.
(Continued)

*Primary Examiner* — Leonard Saint Cyr
(74) *Attorney, Agent, or Firm* — Koppel, Patrick, Heybl & Philpott

(57) ABSTRACT

A communication system according to the present invention includes a plurality of terminal devices that are able to communicate mutually. Each of the terminal devices includes a voice input conversion device, a voice transmitting device, a voice receiving device, and a voice reproduc-
(Continued)

ing device. When there is a plurality of voice signals which has not been completed reproduction, the voice reproducing device reproduces after arranging the voice signals so that respective voices corresponding to the respective voice signals do not overlap.

6 Claims, 33 Drawing Sheets

(30) Foreign Application Priority Data

Mar. 28, 2012 (JP) ................................ 2012-074627
Mar. 28, 2012 (JP) ................................ 2012-074628

(51) Int. Cl.
*H04M 1/60* (2006.01)
*H04M 1/725* (2006.01)

(56) References Cited

U.S. PATENT DOCUMENTS

| 2002/0090943 | A1* | 7/2002 | Kwon | H04W 4/02 455/433 |
|---|---|---|---|---|
| 2003/0051252 | A1* | 3/2003 | Miyaoku et al. | 725/109 |
| 2003/0067922 | A1* | 4/2003 | Yoshitani | 370/394 |
| 2006/0155548 | A1 | 7/2006 | Ichihara | |
| 2007/0223677 | A1 | 9/2007 | Ono | |
| 2008/0107045 | A1 | 5/2008 | Berstis et al. | |
| 2009/0150151 | A1 | 6/2009 | Sakuraba et al. | |
| 2009/0198495 | A1* | 8/2009 | Hata | 704/246 |
| 2010/0009708 | A1 | 1/2010 | Horio et al. | |
| 2011/0105094 | A1* | 5/2011 | Hassan | H04N 7/163 455/418 |

FOREIGN PATENT DOCUMENTS

| JP | 2006195577 A | 7/2006 |
|---|---|---|
| JP | 2006229903 | 8/2006 |
| JP | 2007259293 A | 10/2007 |
| JP | 2009139592 A | 6/2009 |
| JP | 2011215861 A | 3/2010 |
| WO | WO2008/126259 A1 | 10/2008 |

OTHER PUBLICATIONS

International Search Report Form PCT/ISA/210 for PCT/JP2012/082533 completed Feb. 21, 2013.
Extended European Search Report from European Appl. No. 12857865.5-1972, dated Jun. 18, 2015.
Notice of Reasons for Rejection from corresponding Japanese Patent Application No. 2013-549331, dated Jan. 25, 2017.

* cited by examiner

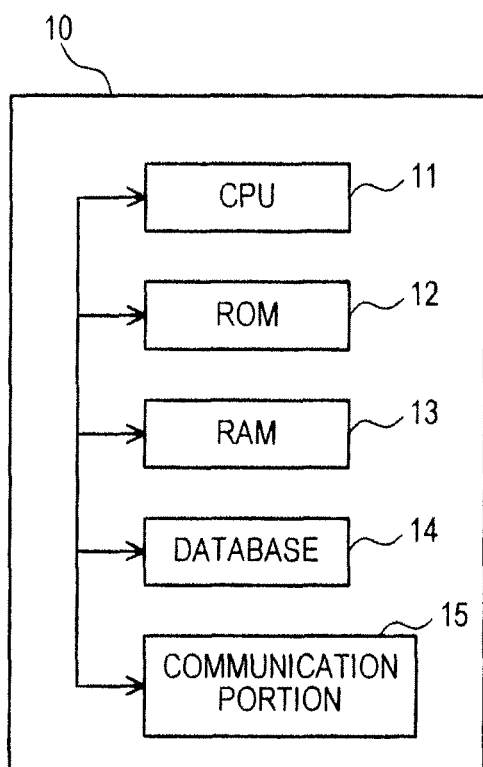

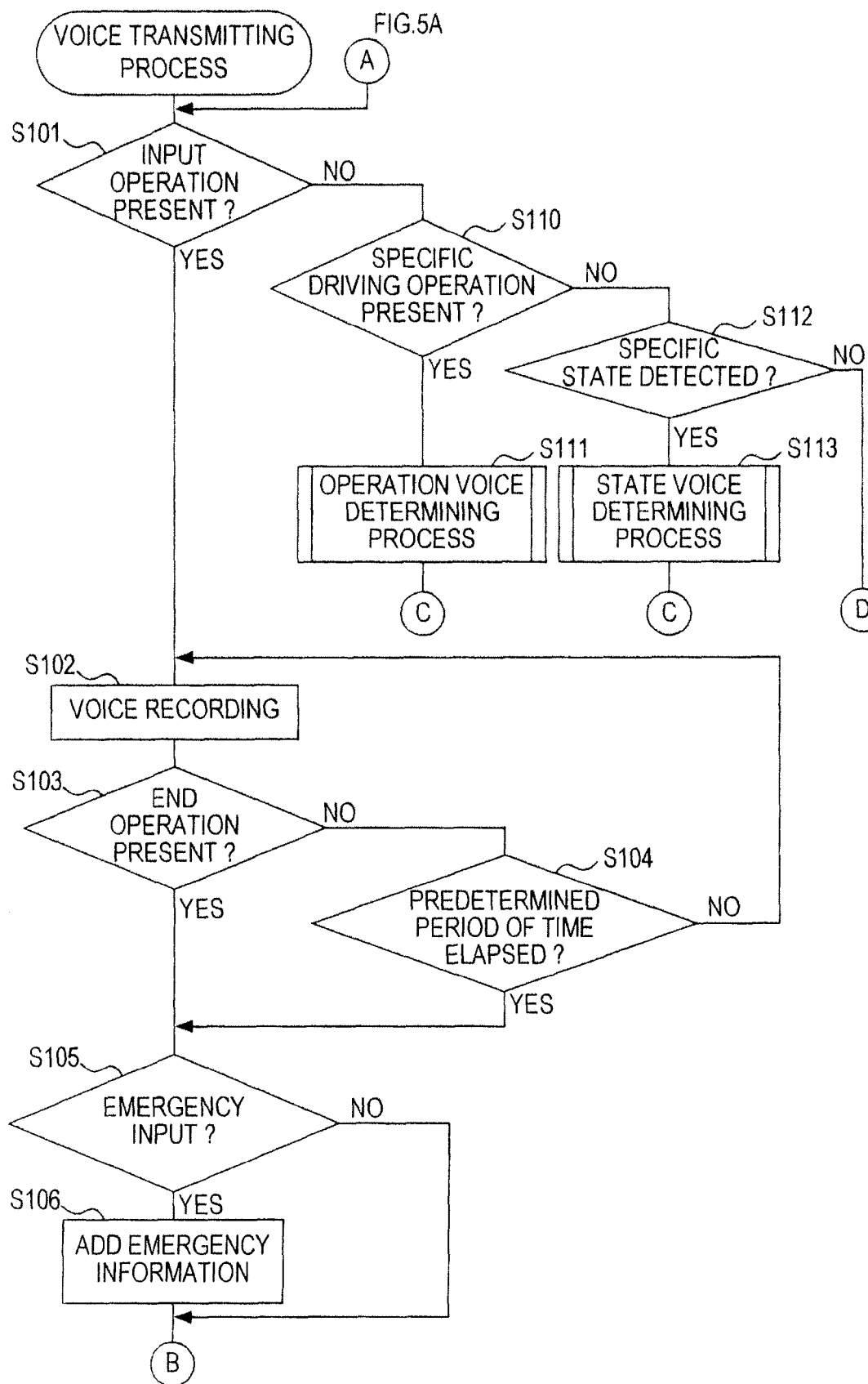

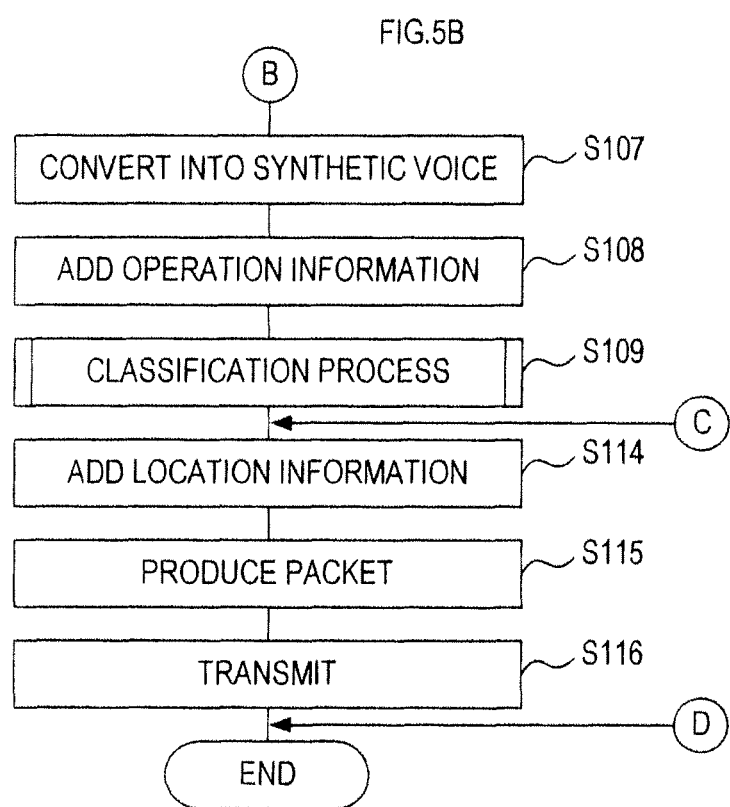

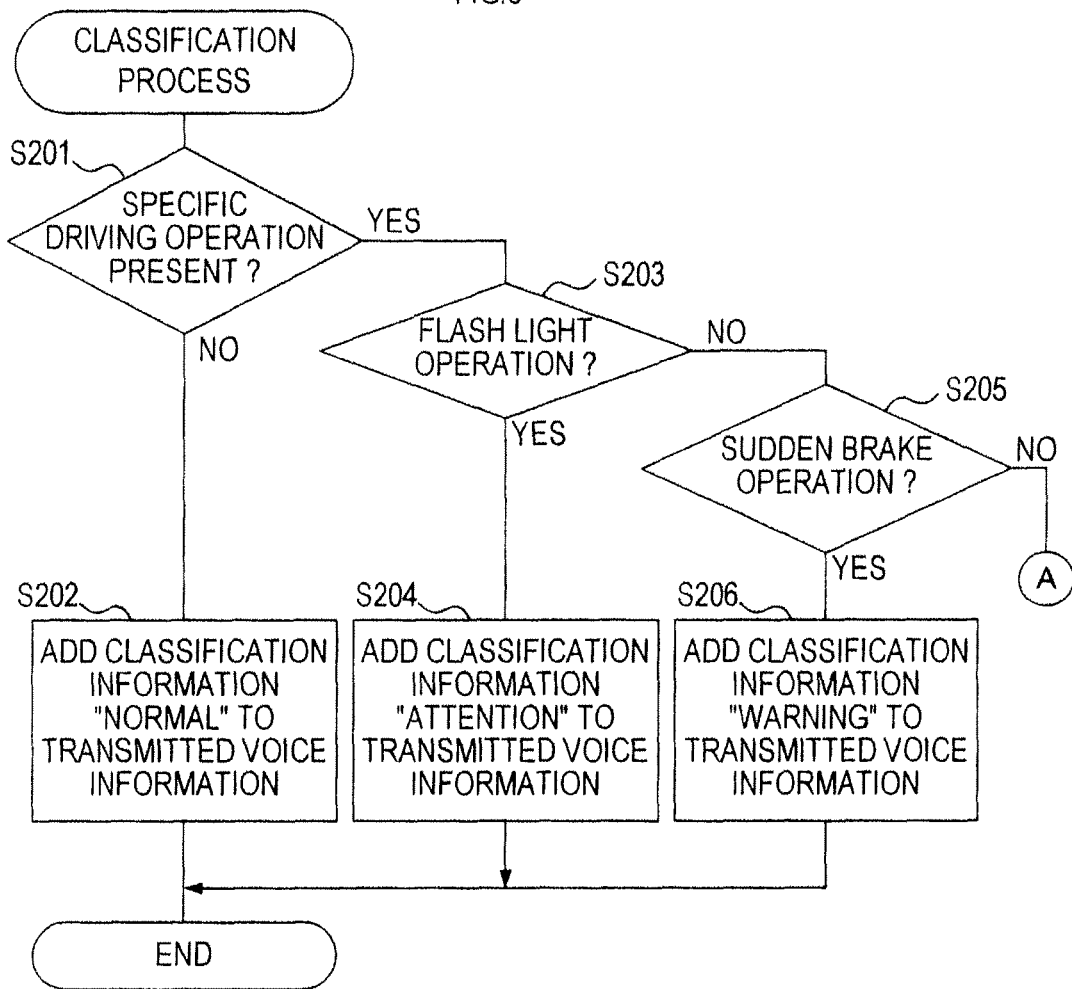

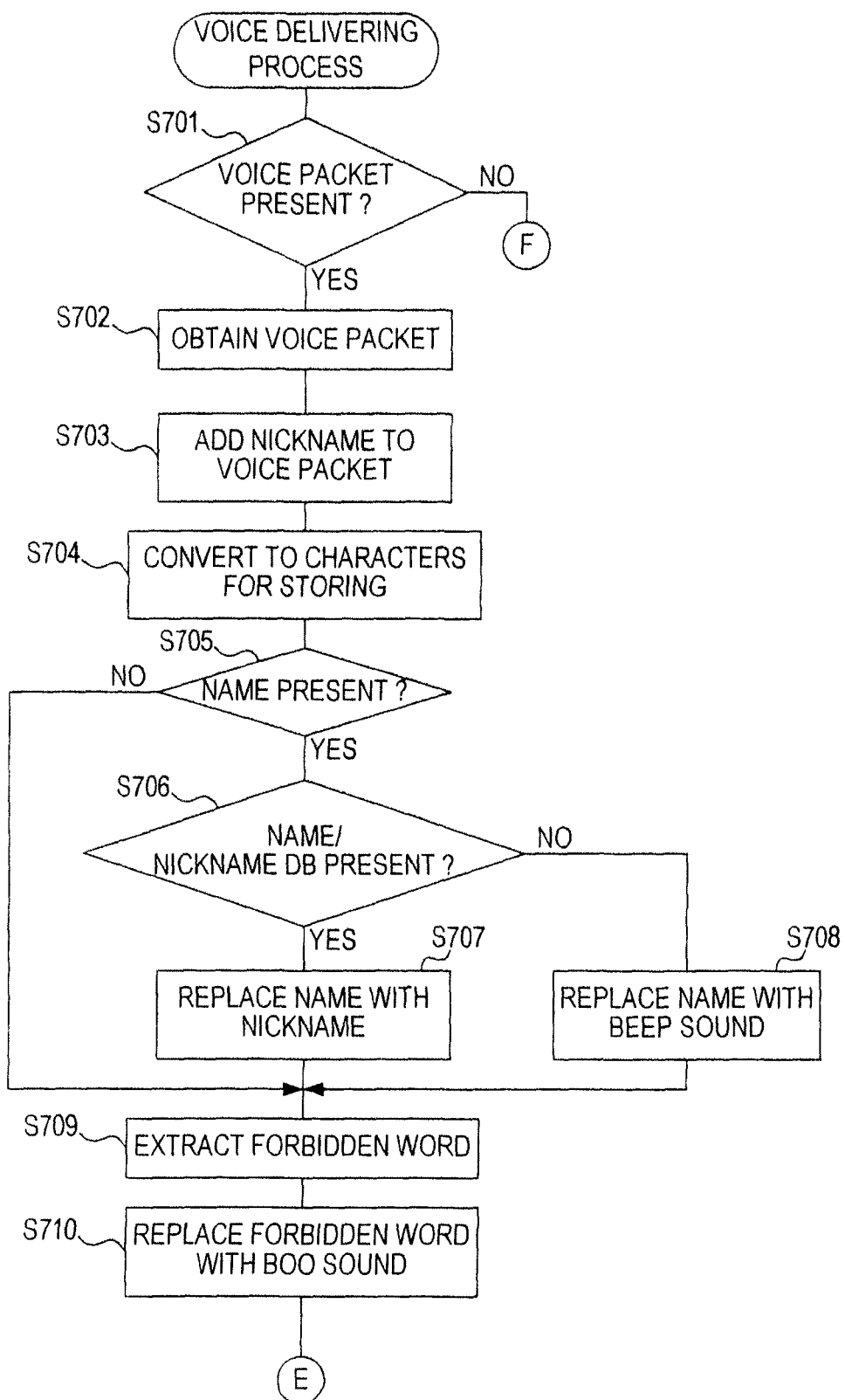

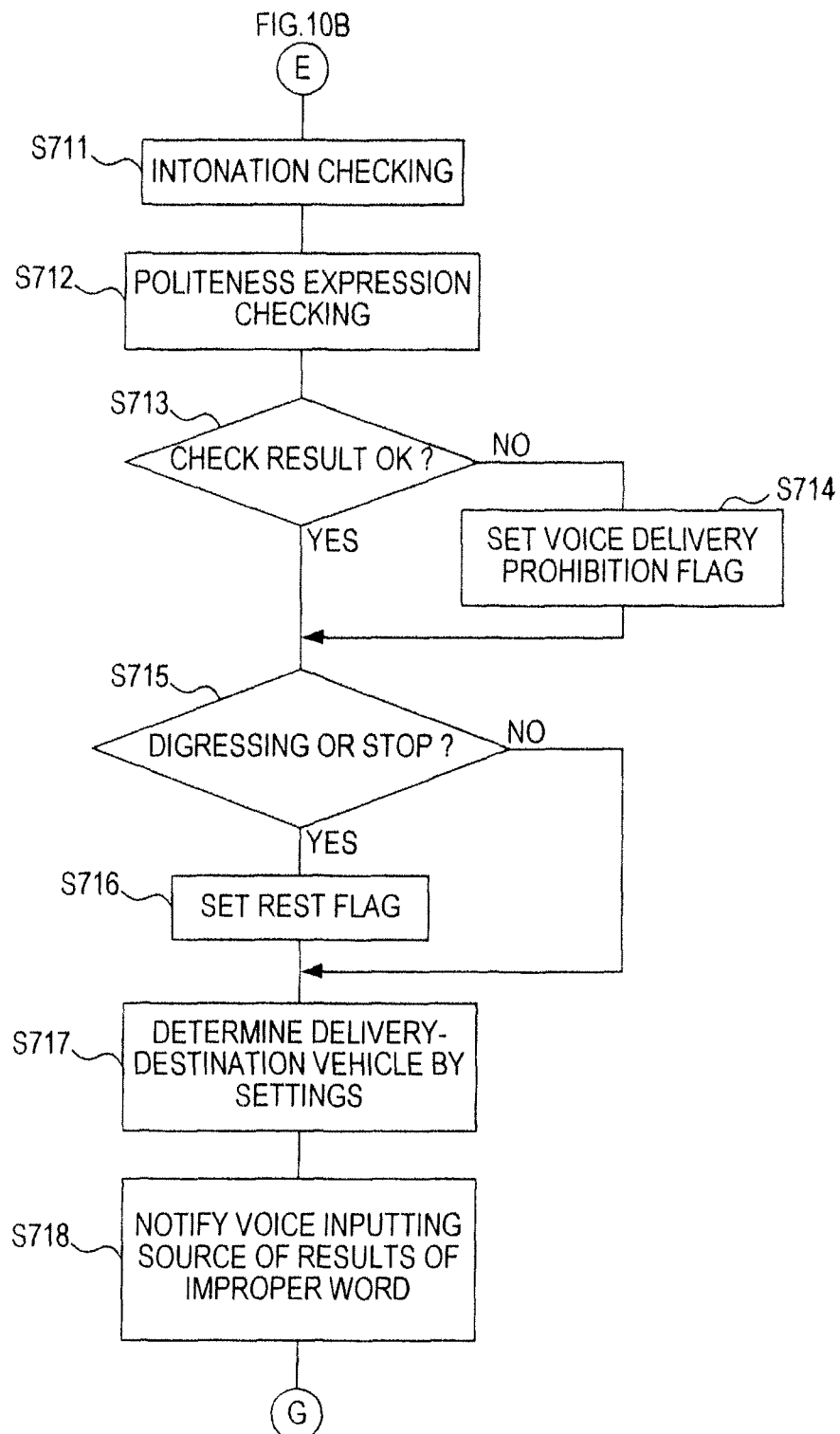

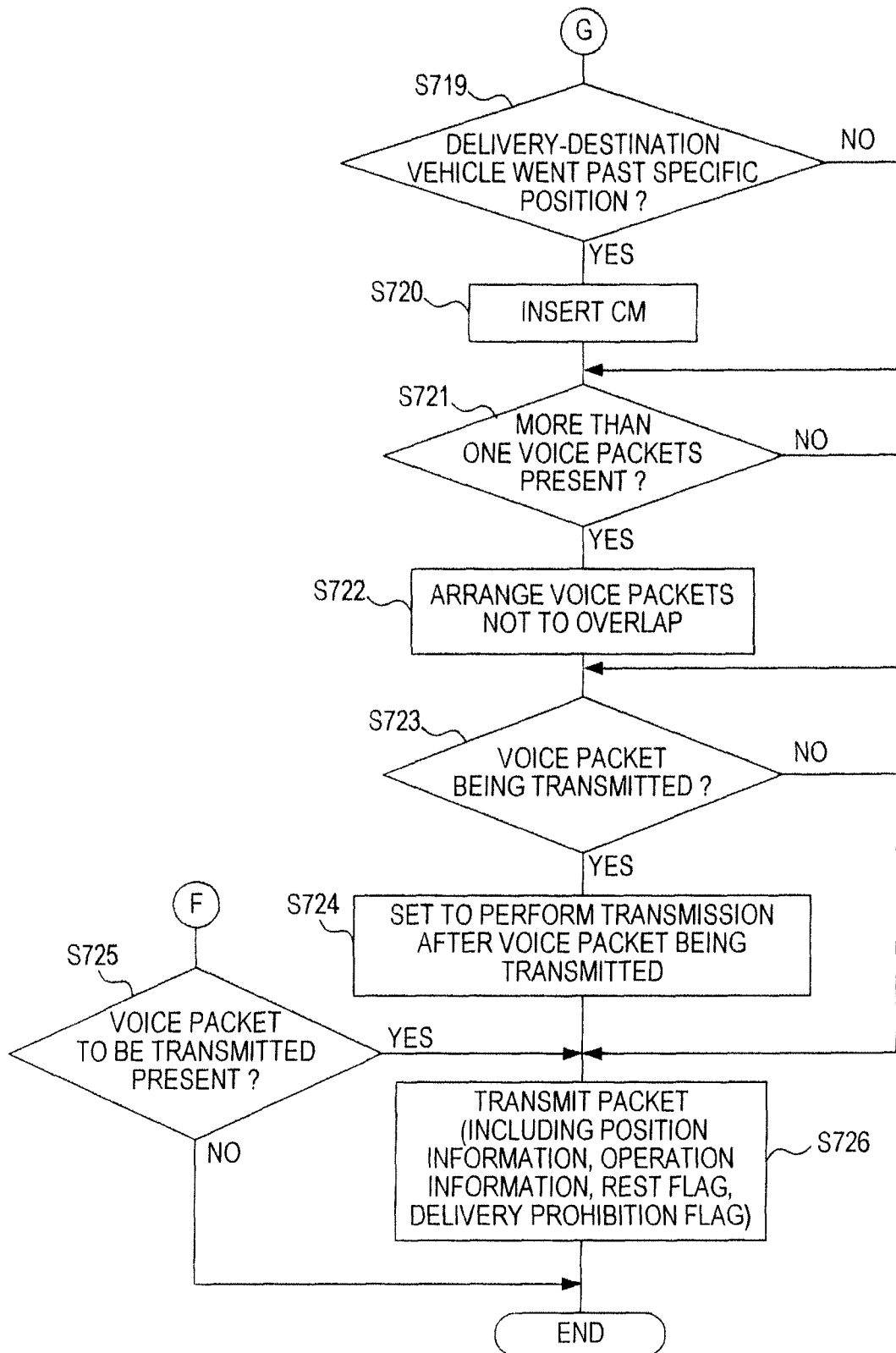

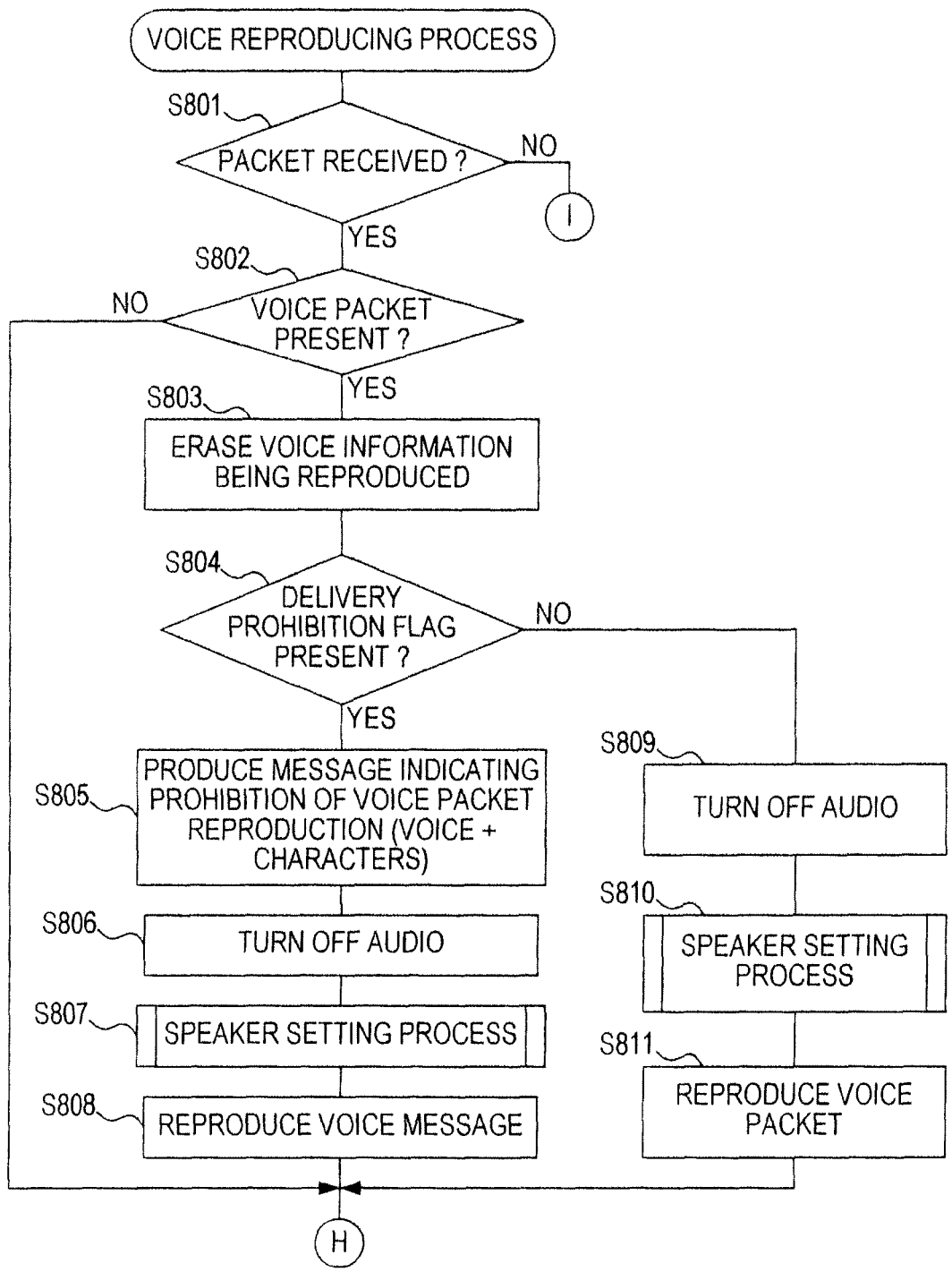

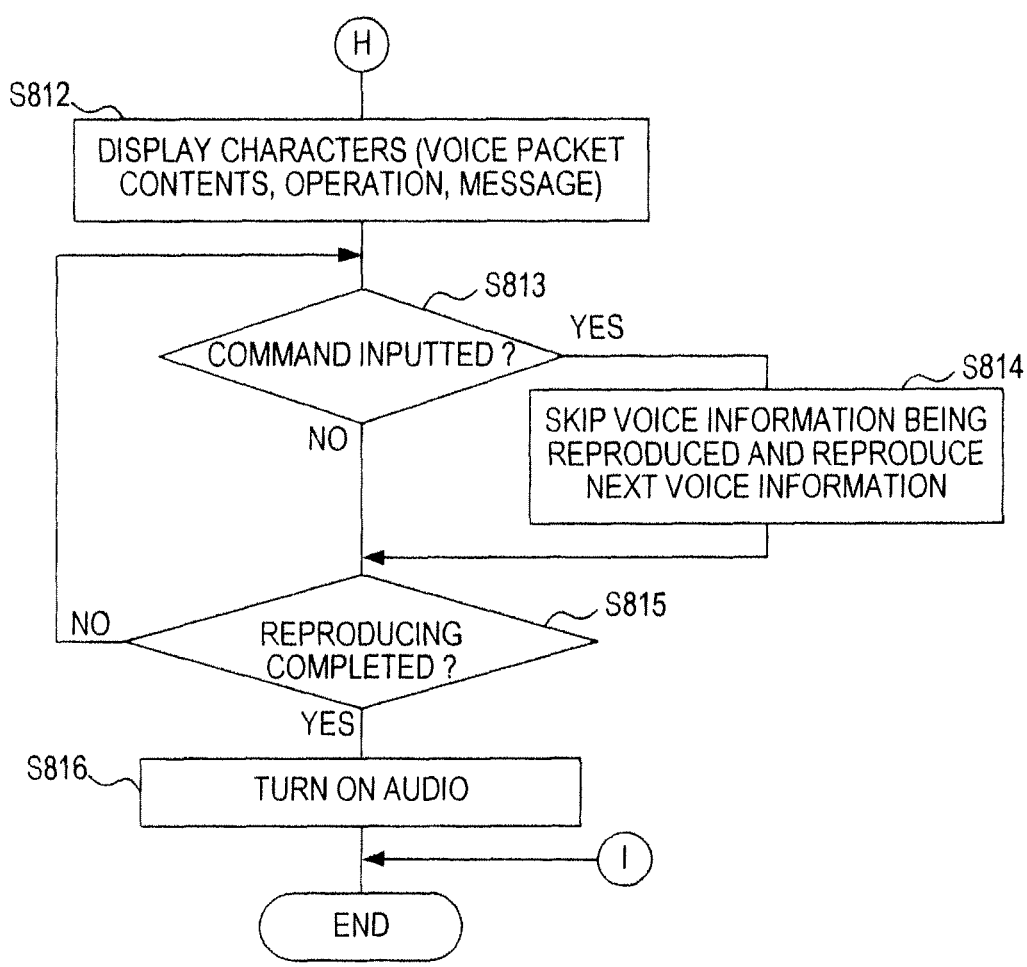

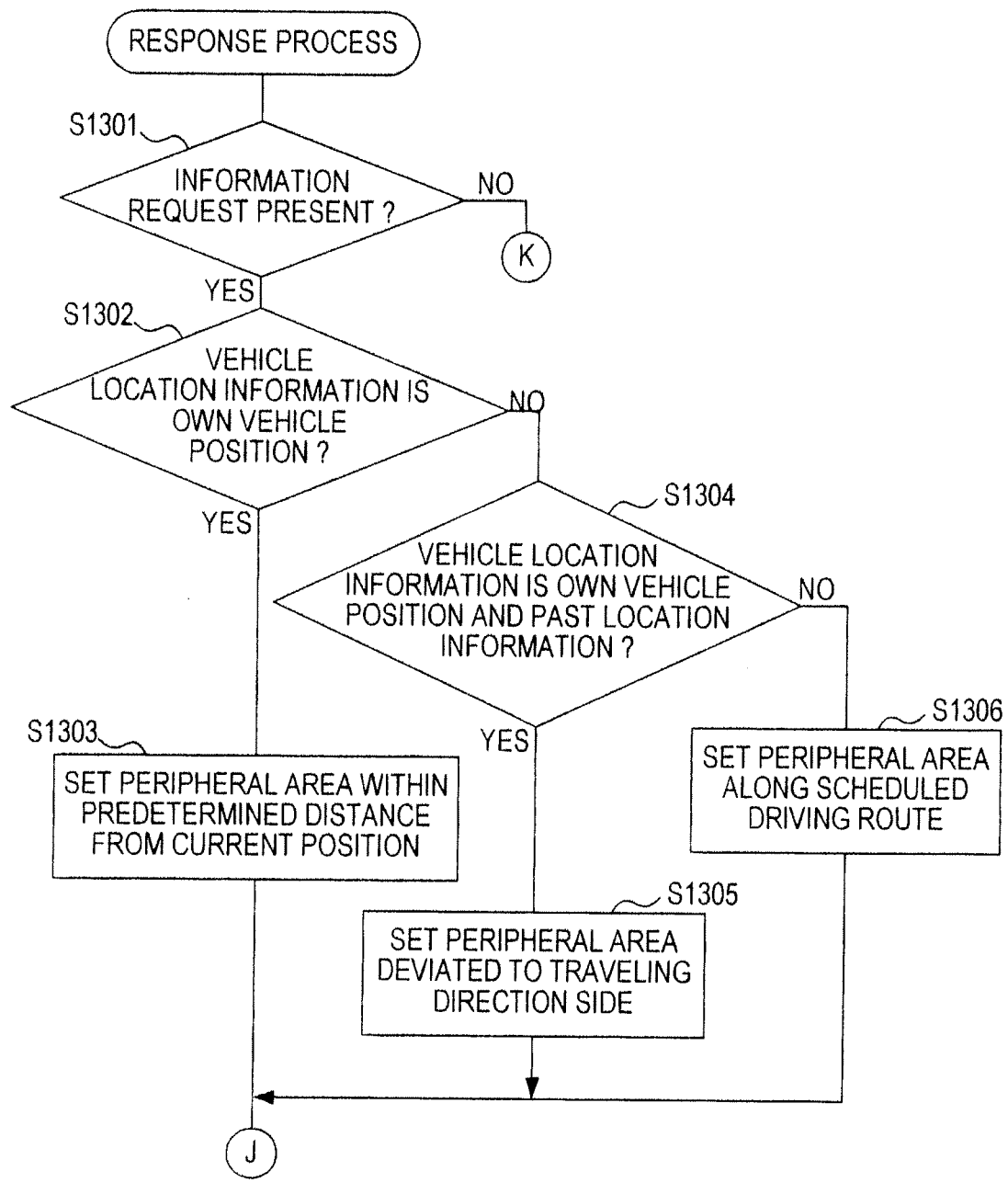

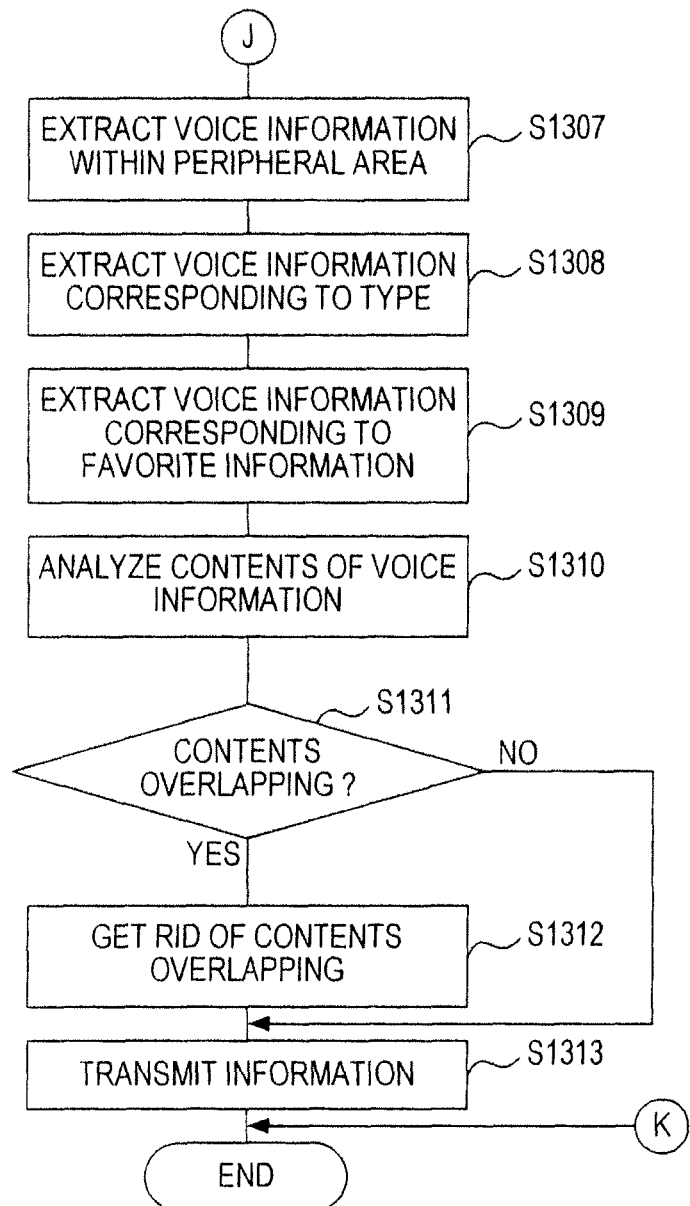

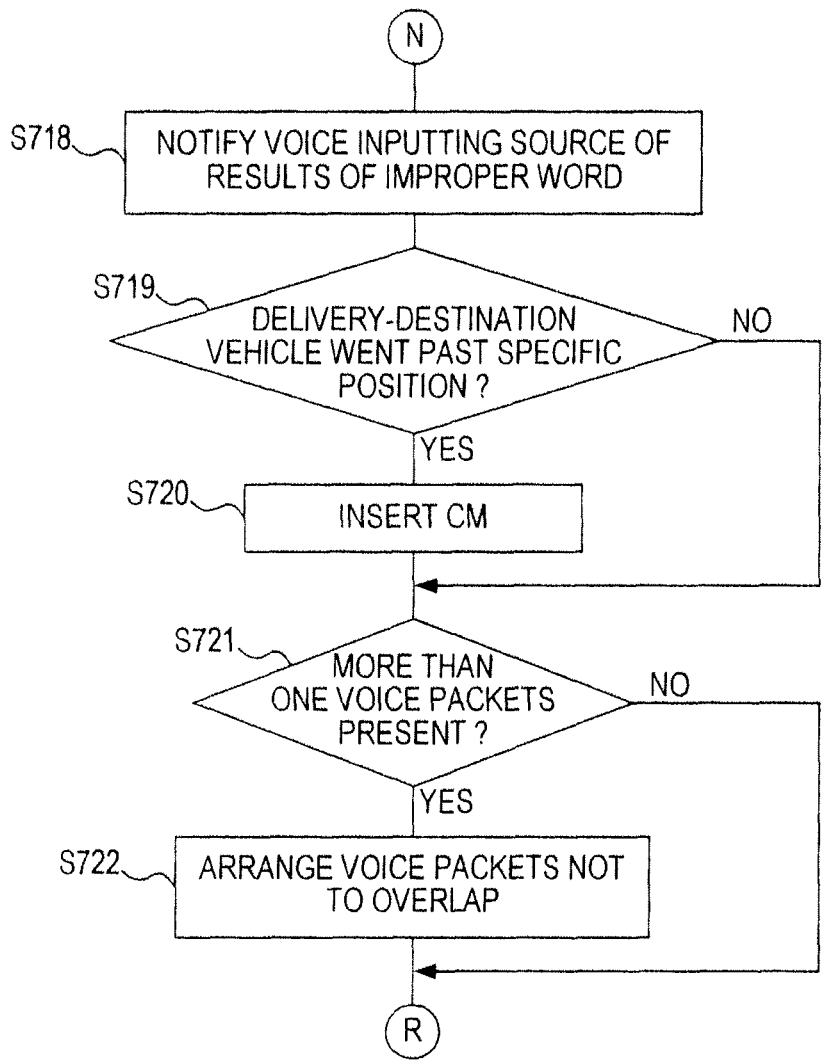

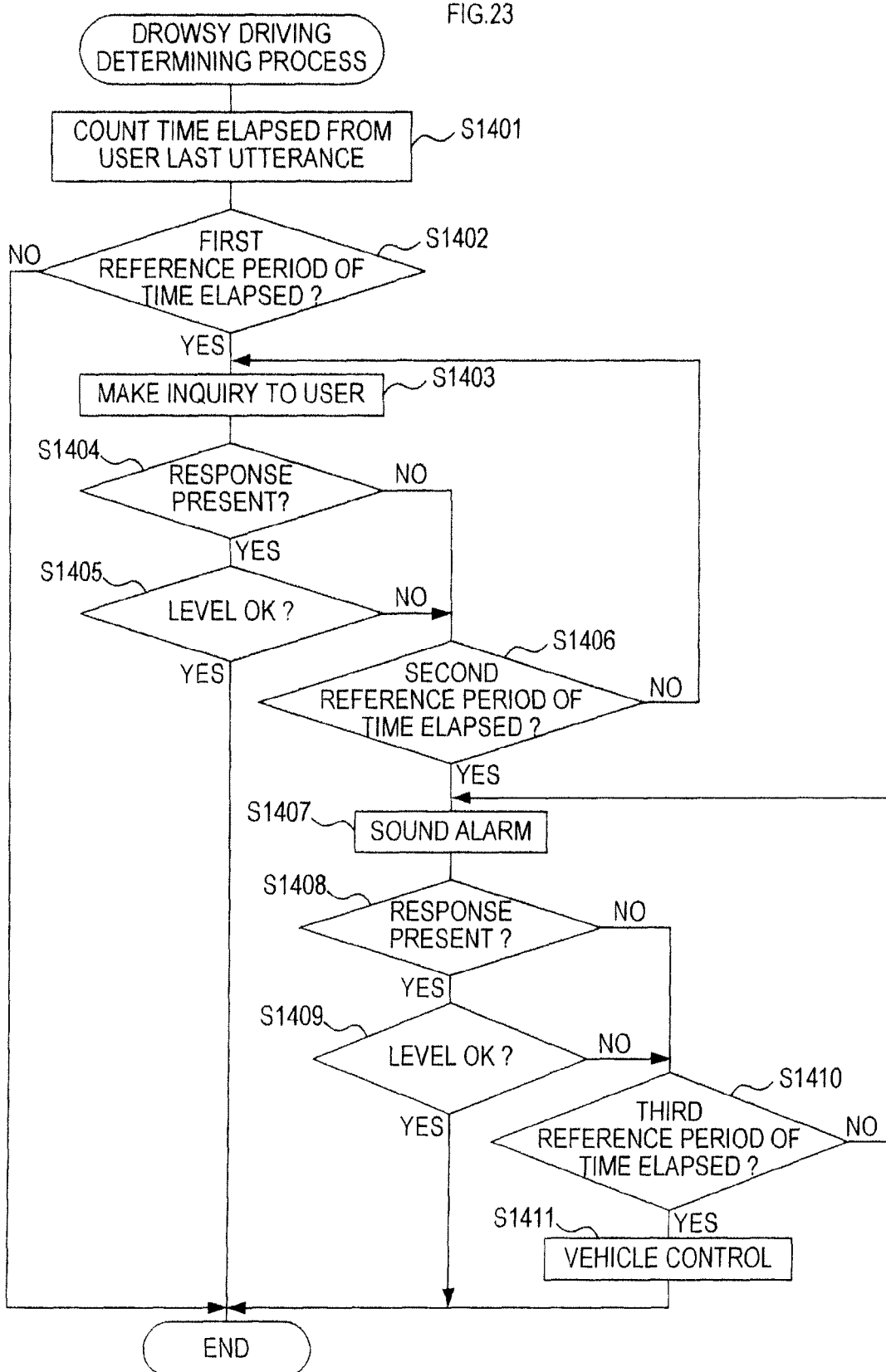

COMMUNICATION SYSTEM AND TERMINAL DEVICE

CROSS-REFERENCE TO RELATED APPLICATIONS

This international application claims the benefits of Japanese Patent Applications No. 2011-273578 and 2011-273579 both filed Dec. 14, 2011, and Japanese Patent Applications No. 2012-074627 and 2012-074628 both filed Mar. 28, 2012 in the Japan Patent Office, and the entire disclosures of Japanese Patent Applications No. 2011-273578, 2011-273579, 2012-074627, and 2012-074628 are incorporated herein by reference.

TECHNICAL FIELD

The present invention relates to a communication system having a plurality of terminal devices and relates to a terminal device.

BACKGROUND ART

A system is known, in which, when a number of users each input transmission contents in characters, such as what they would like to tweet etc., by use of terminal devices such as cell phones etc., a server delivers the transmission contents to each of the terminal devices in a state where the transmission contents are arranged in order (see Patent Document 1, for example).

PRIOR ART DOCUMENTS

Patent Documents

Patent Document 1: Japanese Unexamined Patent Application Publication No. 2011-215861

SUMMARY OF THE INVENTION

Problems to be Solved by the Invention

It is preferable that even users having difficulties in operating terminal devices or visually confirming via terminal devices can safely transmit and receive transmission contents, such as what they would like to tweet.

Means for Solving the Problems

One aspect of the present invention is a communication system including a plurality of terminal devices that are capable of mutually communicating. Each of the plurality of terminal devices includes: a voice input conversion device that, when a user inputs a voice, converts the voice into a voice signal; a voice transmitting device that transmits the voice signal to a device including another terminal device; a voice receiving device that receives a voice signal transmitted from another terminal device; and a voice reproducing device that reproduces the voice signal received. When there are a plurality of voice signals that have not completed reproduction, the voice reproducing device arranges and then reproduces the voice signals so that respective voices corresponding to the respective voice signals do not overlap.

Another aspect of the present invention is a communication system including a plurality of terminal devices and a server that is capable of communicating with the plurality of terminal devices, individually. Each of the plurality of terminal devices includes: a voice input conversion device that, when a user inputs a voice, converts the voice into a voice signal; a voice transmitting device that transmits the voice signal to the server; a voice receiving device that receives a voice signal transmitted by the server; and a voice reproducing device that reproduces the voice signal received. The server includes a delivering device that receives the voice signals transmitted from the plurality of terminal devices and delivers the voice signals to the plurality of terminal devices after arranging the voice signals so that respective voices corresponding to the respective voice signals do not overlap.

According to these communication systems, the transmission contents are inputted by voice, and the transmission contents from other communication devices are reproduced by voice. Therefore, even users having difficulties in operating or visually confirming terminal devices can safely transmit and receive transmission contents, such as what they would like to tweet, etc.

Further, with these communication systems, when attempting to reproduce voices, reproduction is achieved in a manner that the voices do not overlap. Accordingly, it makes it easy to hear the voices.

In either communication system described above, the voice reproducing device may reproduce once again a previously reproduced voice signal when receiving a specific command by a user. Especially, the voice reproducing device may reproduce a voice signal reproduced most recently.

With these communication systems, a voice signal that the user could not catch due to noise and so on can be reproduced once again at a user's command.

With either communication system described above, the terminal devices may be mounted on vehicles. In this case, the terminal device may include a movement detecting device and an operation control device. The movement detecting device detects a movement of a user's hand positioned on a vehicle steering wheel. The operation control device allows the voice input conversion device to commence its operation when the movement detecting device detects a start specifying movement to start inputting voice. The operation control device controls the voice input conversion device to end its operation when the movement detecting device detects an end specifying movement to stop inputting voice.

According to these communication systems, an operation to input voice can be performed on a steering wheel, thereby allowing a vehicle driving user to input voice more safely.

With either communication system described above, when the start specifying movement or the end specifying movement is performed, a user hand may move in a direction opposite to an operation direction to operate the horn.

According to these communication systems, it is possible to inhibit beeping the horn when the start specifying movement or the end specifying movement is performed.

Next, the terminal device may be configured as a terminal device configuring any of the communication systems described above.

With this type of terminal device, similar effects as any of the communication systems described above may be exhibited.

With the above-described communication system (terminal device), the voice transmitting device may generate a new voice signal by adding, by voice, identification information to identify a user into a voice signal inputted by the user and may transmit the voice signal so generated.

With the communication system including the plurality of terminal devices and the server that is capable of communicating with the respective plurality of terminal devices, the delivering device may generate a new voice signal by adding, by voice, identification information to identify a user into a voice signal inputted by the user and may deliver the voice signal so generated.

According to these communication systems, the transmission contents are inputted by voice, and the transmission contents from other communication devices can be reproduced by voice. Therefore, even a user having a difficulty in operating or visually confirming the terminal device can safely transmit and receive transmission contents, such as what he or she would like to tweet.

Further, with these communication systems, identification information to identify a user is added by voice. Accordingly, the user can notify other users of which user is a voice transmitting source, without telling the user identification information.

In either communication system described above, the identification information to be added may be a user's real name or nickname other than the real name. Further, the contents to be added as the identification information (e.g., real name, first nickname, second nickname, and so on) may change in response to the communication mode. For instance, information to identify users among each other is exchanged in advance, and identification information to be added may be changed based upon whether the communication partner is someone pre-registered.

Any of the communication systems described above may include a keyword extracting device that extracts, from a voice signal before reproducing the voice signal, a predetermined keyword contained in the voice signal, and a voice replacement device that replaces the keyword contained in the voice signal with a voice for another word or a predetermined sound.

According to these communication systems, inappropriate words for delivery (indecent words, words implying personal names, uncivilized words, and others) may be registered as keywords and may be replaced with words or sounds that may be delivered.

Further, the voice replacement device may be activated or deactivated based upon the conditions, such as communication partners, or the like. Still further, a voice signal may be generated, which omits a meaningless word unique to colloquial language, such as "Uh" or "Well". In this case, it is possible to shorten a voice signal reproducing duration depending on an amount of the omission.

Still further, in either communication system described above, each terminal device may include: a position information transmitting device that obtains a position information of itself, makes the position information correspond to a voice signal to be transmitted from the terminal device, and transmits the voice signal to another terminal device; a position information obtaining device that obtains position information transmitted from another terminal device; and a voice volume control device that controls a voice volume outputted when the voice reproducing device reproduces a voice, in response to a positional relationship between a position of a terminal device corresponding to the voice reproduced and the position of the terminal device itself.

According to these communication systems, the voice volume is controlled in response to a positional relationship between the position of the terminal device corresponding to the voice reproduced and the position of the terminal device itself. Therefore, a user who listens to the voice may sense a positional relationship between another terminal device and the user's own terminal device.

The voice volume control device may control the voice volume to reduce as the distance to another terminal device gets larger. Further, when voices are outputted from a plurality of speakers, the voice volume control device may control a voice volume so that the voice volume from the direction where another terminal device is located from the user's position is made greater in response to the direction where another terminal device is located relative to the position of the user's own terminal device. Still further, such controls may be combined.

The above-described communication systems each may include a character converting device that converts a voice signal into characters and a character outputting device that outputs on a display the characters after conversion.

According to these communication systems, information that a user missed by voice can be confirmed via characters.

In either communication system described above, information indicating a vehicle state or a user driving operation (operating states of lights, wipers, televisions, radios etc., vehicle running states such as travel speed, travel direction, etc., control states such as values detected by vehicle sensors, or presence or absence of malfunctions, etc.) may be transmitted being combined with the voice.

Here, such information may be outputted by voice or by characters. Further, for example, various information, such as traffic congestion information etc., may be generated based upon information obtained from another terminal device, and the information so generated may be outputted.

In either communication system described above, a structure in which the terminal devices exchange voice signals mutually and directly, and a structure in which the terminal devices exchange voice signals via the server, may be switched in response to a predetermined condition (for example, a distance to a base station connected to the server, a communication state between the terminal devices, a user setting, or the like).

Advertisements may be supplied by voice at every fixed time, every fixed number of voice signal reproduction times, or in response to the position of the terminal device. The advertisement contents may be transmitted to the terminal device, by which the voice signal is reproduced, from an advertiser's terminal device, a server, etc.

In this case, a user may be allowed to talk (communicate) with the advertiser by inputting a predetermined operation to the terminal device, or a user of the terminal device may be guided to the store of the advertiser.

Further, in either communication system described above, a communication partner may be a large unspecified number or limited to a specific partner.

For example, in case of the structure to exchange position information, a terminal device within a certain distance may be considered as a communication partner, or a specific user (preceding vehicle, oncoming vehicle, etc. (specified by image-capturing of a vehicle license plate by a camera, or by GPS)) or a user falling into a preset group may be considered as a communication partner. Further, such communication partner may be changed by setting (so that a communication mode can be changed).

When the terminal device is mounted on a vehicle, terminal devices moving on the same road and in the same direction may be considered as communication partners, or terminal devices having a matching vehicle behavior may be considered as communication partners (removed from the communication partner when the vehicle digresses from the road).

Further, it may be configured so that specifying other users, adding to favorites or canceling registration may be preset, thereby enabling a user to select and communicate with a favorite partner. In this case, a voice signal should be transmitted to a predetermined partner by transmitting communication partner information identifying a communication partner when a voice is transmitted or by registering communication partner information in the server when the server is present.

Still further, it may be configured so that respective directions are made correspond to switches such as a plurality of buttons, a user specifies by the switch a direction where a communication partner exists, and therefore only users existing in the direction are set as communication partners.

Still further, it may be configured to determine a user's emotion at a time of inputting a voice or whether the user is speaking in a polite way, by detecting, from a voice signal, amplitude of the input level or a politeness expression contained in the voice. As a result, it may be configured not to deliver a user voice that is based upon an excited emotion or is not a polite way of speaking.

Still further, it may be configured to notify a user speaking ill of others or a user getting too excited or speaking impolitely of their improper words. In this case, this notification is made by determining whether any words registered as abusive keywords exist in their voice signal.

Further, either communication system described above is configured to exchange voice signals. Alternatively, such communication system may be configured to obtain information consisting of characters and to convert such information into a voice for reproduction. Also when transmitting a voice, the voice may be delivered after conversion into characters and then may be restored to a voice for reproduction. Such configuration reduces an amount of data to be delivered by communication.

With such configuration where data are delivered in characters, the data may be first translated into a language, which results in the smallest data amount among a plurality of predetermined languages, and then be transmitted.

Recently, an increasing number of users use services, by which information sent by users are managed in a state where other users are allowed to view, such as Twitter (registered trademark), Facebook (registered trademark), etc. Terminal devices, such as personal computers, cell phones (inclusive of smart phones), and others, have been used to send and view such information under these services (JP2011215861).

Meanwhile, users (e.g., vehicle drivers) in vehicles (e.g., automobiles) may be limited with their activities, compared with when they are not in the vehicle, resulting in getting bored. Therefore, using the above-described service in a vehicle allows an effective utilization of time. However, it is difficult to say that, with these conventional services, considerations have been given enough to usage conditions of users in vehicles.

In light of the foregoing, it is required to offer a technology that structures a service efficient to a user in a vehicle.

As one technology, a terminal device of the first reference invention includes: an input device that inputs a voice; an obtaining device that obtains location information; a transmitting device that transmits voice information signifying the voice inputted by the input device to a server shared by a plurality of terminal devices in a manner of being able to specify an utterance position being the location information obtained by the obtaining device when the voice was inputted; and a reproducing device that receives, from the server, the voice information transmitted from another terminal device to the server and reproduces a voice representing the voice information. The reproducing device reproduces voice representing the voice information of which the utterance position is located within a peripheral area determined with reference to the location information obtained by the obtaining device, from among the voice information transmitted from another terminal device to the server.

A voice uttered by a user at a certain place is much more likely to be efficient to other users existing at the place (or heading to the place). Especially, as compared with users out of vehicles, positions of users in the vehicles significantly vary during the course of time (vehicle traveling). Accordingly, other users' voices uttered within the peripheral area defined based upon the current position can be efficient information for the user in the vehicle.

For this point, according to the above described configuration, a user of a terminal device A may be allowed to listen to a voice uttered within a peripheral area designed with reference to a current position of the terminal device A, from among voices uttered by users of another terminal device B (another vehicle). According to this type of terminal device, it is possible to offer efficient information to a user in a vehicle.

With the above-described terminal device, the peripheral area may be an area oriented in the traveling direction side rather than the location information obtained by the obtaining device. According to this configuration, it is possible to reduce, from a reproduction target, voices uttered at places where the vehicle has already passed and to increase voices uttered at places where the vehicle is now heading. Accordingly, such terminal device may be able to enhance information usability.

With the above-described terminal device, the peripheral area may be an area along a scheduled traveling route. According to this configuration, it is possible to exclude, from the reproduction target, voices uttered outside the area along the scheduled traveling route. Therefore, such terminal device may be able to enhance information usability.

A terminal device of the second reference invention includes: a detecting device that detects an occurrence of a specific event related to a vehicle; a transmitting device that transmits, to a server shared by a plurality of terminal devices or another terminal device, voice information signifying voice corresponding to the specific event when the detecting device detects the occurrence of the specific event; and a reproducing device that receives the voice information from the server or another terminal device and reproduces the voice representing the voice information.

According to this configuration, a user of a terminal device A may be allowed to listen to a voice that is transmitted from another terminal device B (another vehicle) and corresponds to the specific event related to the vehicle. Accordingly, a user of the terminal device may be able to comprehend conditions of the other vehicle while driving the user's own vehicle.

With the above-described terminal device, the detecting device may detect, as the specific event, a specific driving operation performed by a vehicle user. The transmitting device may transmit voice information signifying a voice having contents notifying the presence of the specific driving operation when the detecting device detects the specific driving operation. According to this configuration, a user of a terminal device may be able to comprehend the presence of the specific driving operation at the other vehicle while driving the user's own vehicle.

With the above-described terminal device, the detecting device may detect a sudden brake operation. The transmitting device may transmit voice information signifying a voice having the contents notifying the presence of the sudden brake operation when the detecting device detects the sudden brake operation. According to this configuration, a user of a terminal device may be able to comprehend the presence of the sudden brake operation at the other vehicle while driving the user's own vehicle. Therefore, as compared with a case where other vehicle conditions are confirmed only visually, safer driving can be achieved

BRIEF DESCRIPTION OF THE DRAWINGS

FIG. 4 is a block diagram illustrating a schematic structure of a server.

FIG. 5A is a flowchart illustrating a part of a voice transmitting process.

FIG. 5B is a flowchart illustrating the remaining part of the voice transmitting process.

FIG. 6 is a flowchart illustrating classification process.

FIG. 10A is a flowchart illustrating a part of a voice delivering process.

FIG. 10B is a flowchart illustrating another part of the voice delivering process.

FIG. 10C is a flowchart illustrating the remaining part of the voice delivering process.

FIG. 11A is a flowchart illustrating a part of a voice reproducing process.

FIG. 11B is a flowchart illustrating the remaining part of the voice reproducing process.

FIG. 17A is a flowchart illustrating a part of a response process.

FIG. 17B is a flowchart illustrating the remaining part of the response process.

FIG. 22C is a flowchart illustrating further another part of the voice reproducing process according to the modified example.

FIG. 23 is a flowchart illustrating a drowsy driving determining process.

EXPLANATION OF REFERENCE NUMERALS

1 . . . communication system, 10 . . . server, 20 . . . base station, 31 to 33 . . . terminal device, 41 . . . CPU, 42 . . . ROM, 43 . . . RAM, 44 . . . communication portion, 45 . . . input portion, 48 . . . navigation device, 49 . . . GPS receiver, 52 . . . microphone, 53 . . . speaker

MODE FOR CARRYING OUT THE INVENTION

Hereinafter, an embodiment according to the present invention will be described with reference to the drawings.

Structure of the Embodiment

Figure 1:
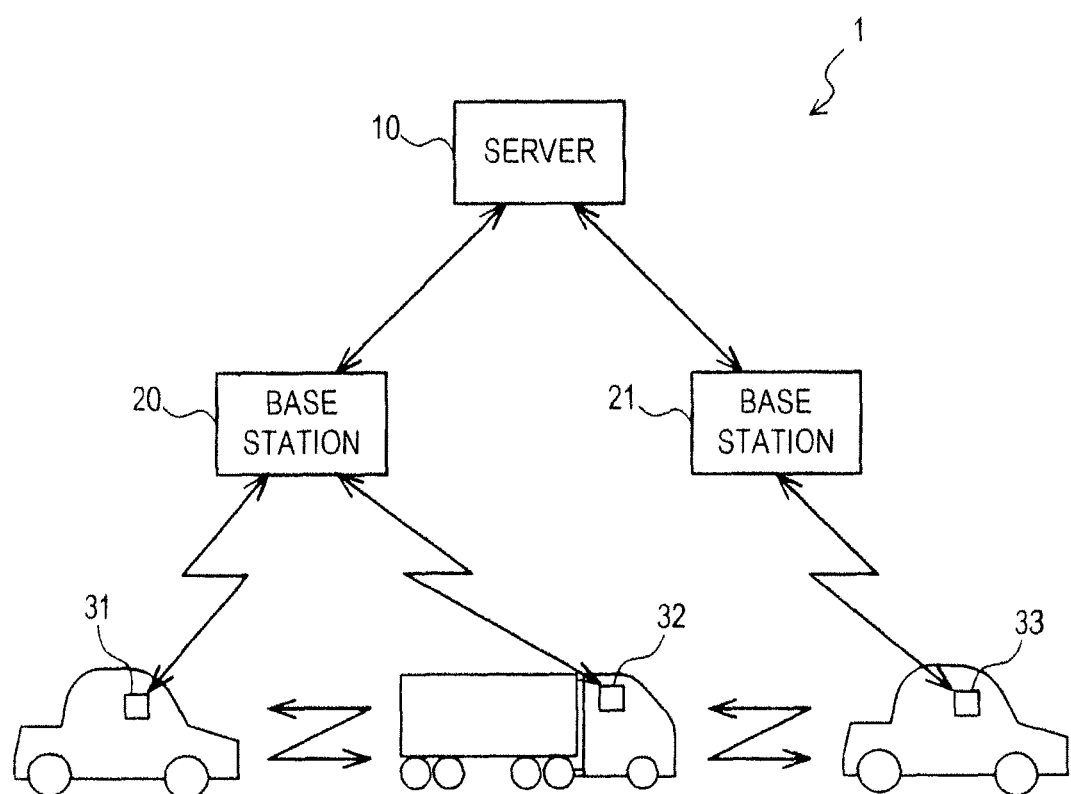
FIG. 1 is a block diagram illustrating a schematic structure of a communication system.
Figure 2:
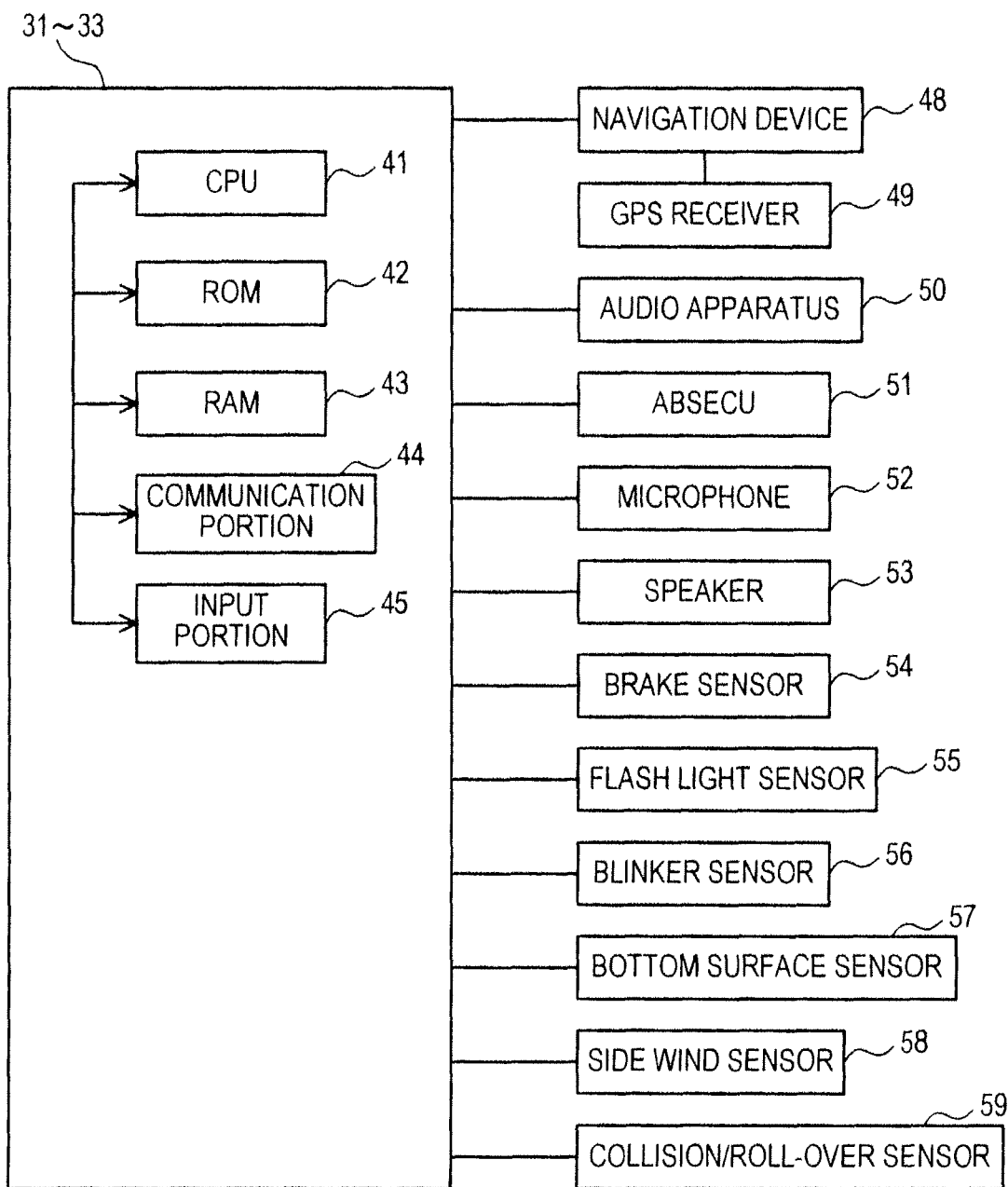
FIG. 2 is a block diagram illustrating a schematic structure of a device mounted on a vehicle.
Figure 3A:
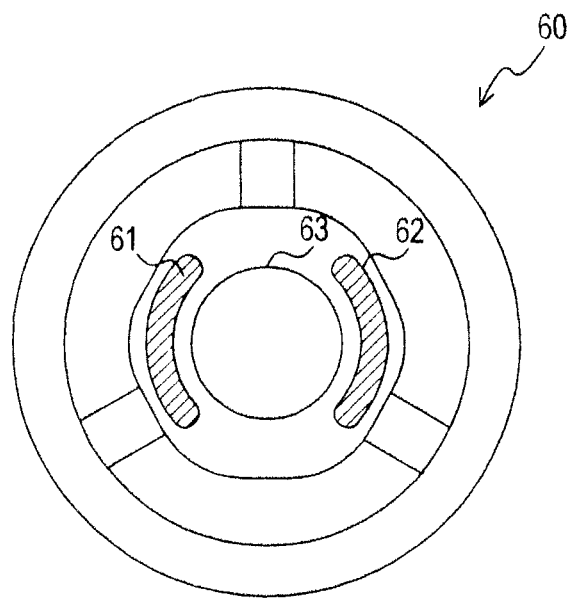
FIGS. 3A to 3C are explanatory views illustrating a structure of an input portion.
Figure 3B:
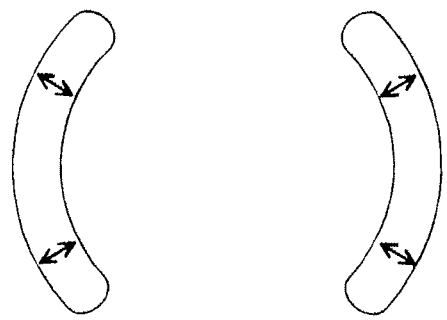
Figure 3C:
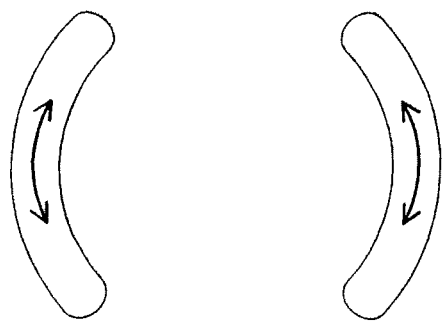

FIG. 1 is a block diagram illustrating a schematic structure of a communication system 1 to which the present invention is applied. FIG. 2 is a block diagram illustrating a schematic structure of a device mounted on a vehicle. FIGS. 3A to 3C are explanatory views illustrating a structure of an input portion 45. FIG. 4 is a block diagram illustrating a schematic structure of a server 10.

The communication system 1 has a function in which users of terminal devices 31 to 33 are allowed to mutually communicate by voice by performing simple operations. Users hereinafter refer to vehicle passengers (e.g., drivers). As illustrated in FIG. 1, the communication system 1 includes the plurality of terminal devices 31 to 33 capable of mutual communication and the server 10 capable of communicating with the terminal devices 31 to 33 via base stations 20, 21. That is, the server 10 is shared by the plurality of terminal devices 31 to 33. According to the embodiment, the three terminal devices 31 to 33 are illustrated for simple explanation; however, a greater number of terminal devices may be employed.

The terminal devices 31 to 33 are configured as vehicle-mounting devices mounted on vehicles, such as passenger vehicles, trucks, and so on. As illustrated in FIG. 2, each of the terminal devices 31 to 33 is a known microcomputer having a CPU 41, a ROM 42, a RAM 43, and others. The CPU 41 implements various processes, such as a voice transmitting process, a voice reproducing process, and others, as described below, based upon programs stored in the ROM 42 and so on.

Each of the terminal devices 31 to 33 further includes a communication portion 44 and the input portion 45. The communication portion 44 has a function to communicate with the base stations 20, 21 configured as wireless base stations, for example, for cell phones (communication portion to communicate with the server 10 and the other terminal devices 31 to 33 via a cell phone network) and a function to communicate directly with the other terminal devices 31 to 33 positioned within its visible range (terminal devices 31 to 33 mounted on other vehicles, such as preceding vehicles, rear vehicles, oncoming vehicles, and so forth) (communication portion to communicate directly with the other terminal devices 31 to 33).

The input portion 45 is configured as a button, switch, or the like via which a user of each terminal device 31 to 33 inputs a command. The input portion 45 also has a function to read a user's biological features.

As illustrated in FIG. 3A, the input portion 45 is also configured as a plurality of touch panels 61 and 62 on a user-facing surface of a vehicle steering wheel 60. These touch panels 61 and 62 are arranged around a horn switch 63 and somewhere a driver does not touch when operating the steering wheel for vehicle turning. These touch panels 61 and 62 detect a movement of a user's hand (fingers) placed on the vehicle steering wheel 60.

As illustrated in FIG. 2, each terminal device 31 to 33 is connected, via communication wires (e.g., in-vehicle LAN), to a navigation device 48, an audio apparatus 50, an ABSECU 51, a microphone 52, a speaker 53, a brake sensor 54, a flash light sensor 55, a blinker sensor 56, a bottom surface sensor 57, a side wind sensor 58, a collision/roll-over sensor 59, and other known plural sensor groups, which are all mounted on a vehicle.

The navigation device 48 is provided with a current position detecting portion that detects a current position of the vehicle and a display to display an image on it, in the same manner as known navigation devices. The navigation device 48 performs a known navigation process based upon information on a vehicle position coordinates (current position) detected by a GPS receiver 49, and so on. In response to a request of the current position by the terminal device 31 to 33, the navigation device 48 returns information on the latest current position to the terminal device 31 to 33. When the navigation device 48 receives a command from the terminal device 31 to 33 requesting to display character information, the navigation device 48 displays characters corresponding to the character information on the display.

The audio apparatus 50 is a known acoustic reproducer to reproduce music and so on. Music and so on reproduced by the audio apparatus 50 is outputted from the speaker 53.

The ABSECU 51 is an electronic control unit (ECU) that performs controls related to an anti-lock brake system (ABS). The ABSECU 51 inhibits brake locking by controlling a braking force (brake oil pressure) so that a vehicle wheel slip rate falls within a predetermined range (slip rate at which a vehicle is braked safely and promptly). That is, the ABSECU 51 functions as a brake-lock inhibit unit. The ABSECU 51 outputs a notification signal to the terminal device 31 to 33 when the ABS functions (when the braking force control is started).

The microphone 52 inputs a voice uttered by a user. The speaker 53 is configured to be as, for example, a surround system of 5.1 ch including five speakers and a subwoofer. The speakers are arranged surrounding the user.

The brake sensor 54 detects a sudden brake operation when a brake pedal depressing speed by a user is equal to or greater than a determination reference value. The determination of sudden brake operation is not limited hereto and may be made based upon a brake pedal depressing amount or based upon a vehicle acceleration (deceleration), for example.

The flash light sensor 55 detects a light flashing operation by a user (operation to briefly change head lights from a low beam to a high beam).

The blinker sensor 56 detects a blinker operation by a user (operation to blink either a right or left winker).

The bottom surface sensor 57 detects a state where a vehicle bottom surface is in contact with a road level difference or a high possibility of such contact. According to the embodiment, detecting members are provided on the lower surfaces of the front and rear bumpers (lowermost parts on the vehicle lower surface excluding vehicle wheels), which easily deform or displace by contact with an outside object (road level difference, etc.) and recovers to their original conditions (before deformation or displacement) when the contact ends. The bottom surface sensor 57 detects the state where the vehicle bottom surface is in contact with the road level difference or the high possibility of such contact, by detecting the detecting members' deformation or displacement. A sensor may be employed, which detects, with no contact with the outside object, the state where the vehicle bottom surface is in contact with the road level difference or the high possibility of such contact.

The side wind sensor 58 detects a strong side wind against a vehicle (e.g., side wind having a wind pressure equal to or greater than the determination reference value). The side wind sensor 58 may detect a wind pressure or a wind amount.

The collision/roll-over sensor 59 detects a state where a vehicle highly possibly encountered an accident, such as a vehicle collision with an outside object (inclusive of other vehicles), a vehicle rolling-over, etc. The collision/roll-over sensor 59 may be configured to detect an occurrence of a severe impact (acceleration) against a vehicle. Further, the collision/roll-over sensor 59 may detect the vehicle collision and rolling-over separately. For example, it may be determined whether a vehicle is a rolling-over, based upon an inclination angle of the vehicle (vehicle body). Still further, it may include other states where a vehicle highly possibly encountered an accident (e.g., activated air bag).

As illustrated in FIG. 4, the server 10 includes a hardware configuration of a well-known server having a CPU 11, a ROM 12, a RAM 13, a database (storage) 14, a communication portion 15, and so on. The server 10 performs various processes such as a voice delivering process and so on as described below.

The database 14 of the server 10 stores a username/nickname DB that makes user names of the terminal devices 31 to 33 correspond to nicknames of the users, a communication partner DB that describes the IDs of the terminal devices 31 to 33 and communication partners, a forbidden word DB that registers forbidden words, an advertisement DB that describes an ID of an advertiser's terminal device and an advertisement area range, and so on. Registering the user names, user nicknames, communication partners, and so on in the server 10 permits the users to access services by the present system.

Processes of the Embodiment

A process implemented by such communication system 1 will be described with references to FIGS. 5A, 5B, and the other drawings following FIG. 5B. FIGS. 5A and 5B are flowcharts illustrating a voice transmitting process performed by the CPUs 41 of the terminal devices 31 to 33.

The voice transmitting process is started when the terminal device 31 to 33 is powered on and is subsequently repetitively performed. The voice transmitting process transmits voice information signifying voice uttered by a user to other devices (such as the server 10, the other terminal device(s) 31 to 33, and so on). The voice information to be transmitted to other devices is also hereinafter referred to as "transmitted voice information".

In more detail, as illustrated in FIGS. 5A and 5B, the CPU 41 first determines the presence or absence of an input operation via the input portion 45 (S101). The input operation includes a normal input operation and an input operation for emergency, both of which are registered as different input operations in its storage such as ROM.

As the normal input operation, for example as illustrated in FIG. 3B, sliding movements of hands on the touch panels 61 and 62 in a radial direction of the steering wheel 60 are registered. As the emergency input operation, for example as illustrated in FIG. 3C, sliding movements of hands on the touch panels 61 and 62 in a circumferential direction of the steering wheel 60 are registered. In this process, either the normal input operation or the emergency input operation is determined to have been inputted via the touch panels 61 and 62.

As described above, it is preferable that the input operations are designed to be performed in a different direction from an operating direction (pressing direction) of the horn switch 63, so that an erroneous operation of the vehicle horn may be inhibited.

When there is no input operation (S101: NO), the process proceeds to S110 as described below. When there is an input operation (S101: YES), a voice uttered by a user (voice used as the transmitted voice information) may be started for voice recording (S102).

The CPU 41 determines the presence or absence of an end operation via the input portion 45 (S103). The end operation is registered in advance in storage such as ROM, in the same manner as the input operation. This end operation may be operated in the same manner as the input operation or in a different manner therefrom.

When there is no end operation (S103: NO), the CPU 41 determines whether a predetermined reference period of time (e.g., twenty seconds) has elapsed since the performance of the input operation (S104). The reference period of time is herein provided to prohibit a prolonged voice inputting. The reference period of time when communicating with a specific communication partner is designed to be the same as or longer than the reference period of time when communicating with a non-specific communication partner. The reference period of time may be designed to be infinite.

When the reference period of time has not elapsed (S104: NO), the process returns to S102. When the reference period of time has elapsed (S104: YES) or when the end operation is performed in S103 (S103: YES), the CPU 41 terminates the voice recording and determines whether the input operation is the emergency input operation (S105). When the input operation is the emergency input operation (S105: YES), the CPU 41 adds an emergency information flag indicating emergency voice information (S106), and the process proceeds to S107.

When the input operation is not the emergency input operation (S105: NO), the process proceeds to S107 immediately. Subsequently, the CPU 41 converts the recorded voice (real voice) to a synthetic voice (mechanical sound) (S107). Specifically, first of all, the recorded voice is converted to a text (character data) by use of a known voice recognition technology. Next, the text obtained by the conversion is converted to a synthetic voice by use of a known voice synthesizing technology. In this manner, the recorded voice is converted to the synthetic voice.

Subsequently, the CPU 41 operates so as to add operation information into the transmitted voice information (S108). The operation information hereinafter refers to information indicating a vehicle state or user driving operation (e.g., operation states, such as blinker operation, flash light operation, sudden brake operation, etc.; operating states of the lights, wipers, televisions, radios, etc.; travel states, such as travel speed, acceleration, traveling direction, etc.; control states, such as detection values by various sensors, presence or absence of malfunctions, etc., and others). Such information is obtained via communication wires (in-vehicle LAN, for example) installed in the vehicle.

Subsequently, the CPU 41 performs a classification process in which the transmitted voice information is classified to any of a plurality of preset types (categories) and classification information indicating the type that the transmitted voice information falls in is added to the transmitted voice information (S109). Such classification is adopted, for example, when the server 10 or the terminal device 31 to 33 extracts (retrieves) necessary voice information from among a lot of different voice information. The transmitted voice information classification may be performed manually by a user or automated. For example, choice items (a plurality of preset types) may be shown on the display for a user's selection. For another example, the contents of the speech may be analyzed, and the transmitted voice transmission may be classified to a type corresponding to the speech contents. For still another example, the transmitted voice transmission may be classified depending on the situation in which the words were uttered (vehicle states, driving operations, etc.).

FIG. 6 is a flowchart illustrating an example of the classification process by which the transmitted voice information is classified automatically. The CPU 41 first determines whether a specific driving operation was performed at the time of uttering (S201). In this case, a flash light operation detected by the flash light sensor 55 and a sudden brake operation detected by the brake sensor 54 fall into the specific driving operation. Further, in this embodiment, the voice information is classified to one of the three types, "normal", "attention", and "warning".

When the CPU 41 determines the absence of the specific driving operation at the time of uttering (S201: NO), the CPU 41 classifies the transmitted voice information into the "normal" and acids the classification information indicating the "normal" to the transmitted voice information (S202).

Meanwhile, when the CPU 41 determines the presence of the flash light operation at the time of uttering (S201: YES, S203: YES), the CPU 41 classifies the transmitted voice information into the "attention" and adds the classification information indicating the "attention" to the transmitted voice information (S204). When the CPU 41 determines the presence of the sudden brake operation at the time of uttering (S203: NO, S205: YES), the CPU 41 classifies the transmitted voice information into the "warning" and adds the classification information indicating the "warning" to the transmitted voice information (S206).

The process proceeds to S114 described below (FIG. 5B) after the above-described classification process. When the CPU 41 determines in S205 that the sudden brake operation was not performed at the time of uttering (S205: NO), the process returns to S101 (FIG. 5A)

In this example, the transmitted voice information is classified into one type, but not limited hereto. For example, like tag information, two or more types may be allocated to one transmitted voice information.

Returning to FIG. 5A, when the CPU 41 determines in S101 the absence of the input operation (S101: NO), the CPU 41 determines whether a specific driving operation was performed (S110). The specific driving operation herein refers to an operation that serves as a trigger to transmit a voice not uttered by a user as the transmitted voice information and may be different from the specific driving operation determined in S201 as described above. When the CPU 41 determines the presence of the specific driving operation (S110: YES), the CPU 41 performs an operation voice determining process to determine transmitted voice information corresponding to the driving operation (S111).

Figure 7:
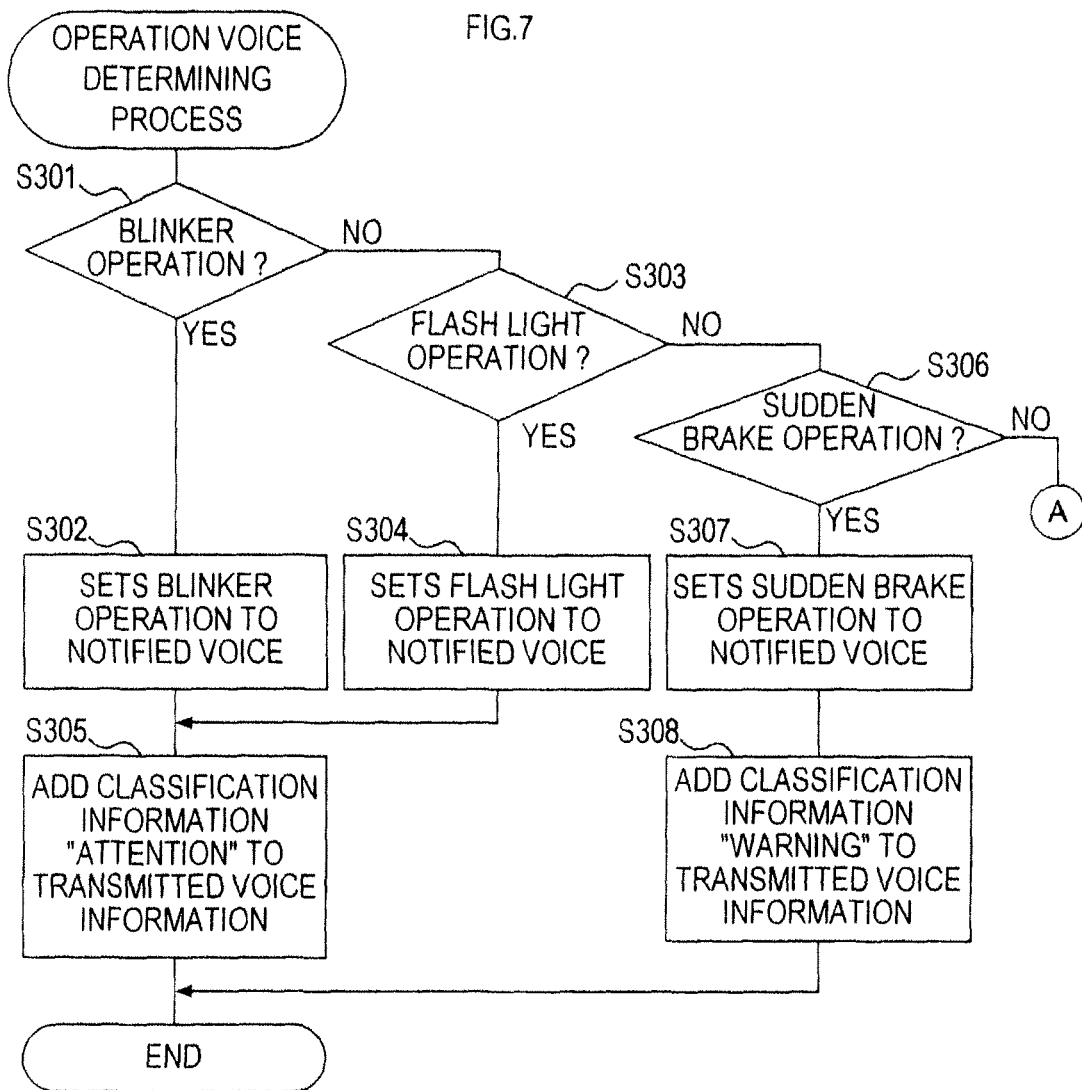
FIG. 7 is a flowchart illustrating an operation voice determining process.

FIG. 7 is a flowchart illustrating an example of the operation voice determining process. In this example, a blinker operation detected by the blinker sensor 56, a flash light operation detected by the flash sensor 55, and a sudden brake operation detected by the bake sensor 54 fall into the specific driving operation of S110.

First, the CPU 41 determines whether the blinker operation was detected as the specific driving operation of S110 (S301). When the CPU 41 determines the presence of detection of the blinker operation (S301: YES), the CPU 41 sets a voice including contents notifying the blinker operation (e.g., a voice such as "A blinker operation was performed.", "Turning to the left (right)", "Attention, please.") to the transmitted voice information (S302).

Meanwhile, when the CPU 41 determines the absence of detection of the blinker operation (S301: NO), the CPU 41 determines whether the flash light operation was detected as the specific driving operation of S110 (S303). When the CPU 41 determines the presence of detection of the flash light operation (S303: YES), the CPU 41 sets a voice including contents notifying the flash light operation (e.g., a voice such as "A flash light operation was performed.", "Attention, please.") to the transmitted voice information (S304).

In both steps, when the blinker operation is detected (S301: YES) and when the flash light operation is detected (S303: YES), the CPU 41 classifies the transmitted voice information into the "attention" and adds the classification information indicating the "attention" to the transmitted voice information (S305). Subsequently, the CPU 41 terminates the operation voice determination process and the process proceeds to S114 (FIG. 5B) as described below.

Meanwhile, when the CPU 41 determines the absence of the flash light operation (S303: NO), the CPU 41 determines whether a sudden brake operation was detected as the specific driving operation of S110 (S306). When the CPU 41 determines the presence of the sudden brake operation (S306: YES), the CPU 41 sets a voice including contents notifying the sudden brake operation (e.g., a voice such as "A sudden brake operation was performed." and so on) to the transmitted voice information (S307). The CPU 41 classifies the transmitted voice information into the "warning" and adds the classification information indicating the "warning" to the transmitted voice information (S308). Subsequently, the CPU 41 terminates the operation voice determining process, and the process proceeds to S114 (FIG. 5B), as described below. When the CPU 41 determines the absence of the sudden brake operation as the specific driving operation of S110 (S306: NO), the process returns to S101 (FIG. 5A).

Returning to FIG. 5A, when the CPU 41 determines in S110 the absence of the specific driving operation (S110: NO), the CPU 41 determines whether a specific state is detected (S112). The specific state herein refers to a state serving as a trigger to transmit a voice not uttered by a user as the transmitted voice information. When the CPU 41 determines the absence of the specific state (S112: NO), the CPU 41 terminates the voice transmitting process. Meanwhile, when the CPU 41 determines the presence of the specific state (S112: YES), the CPU 41 performs a state voice determining process to determine transmitted voice information corresponding to the state (S113).

Figure 8:
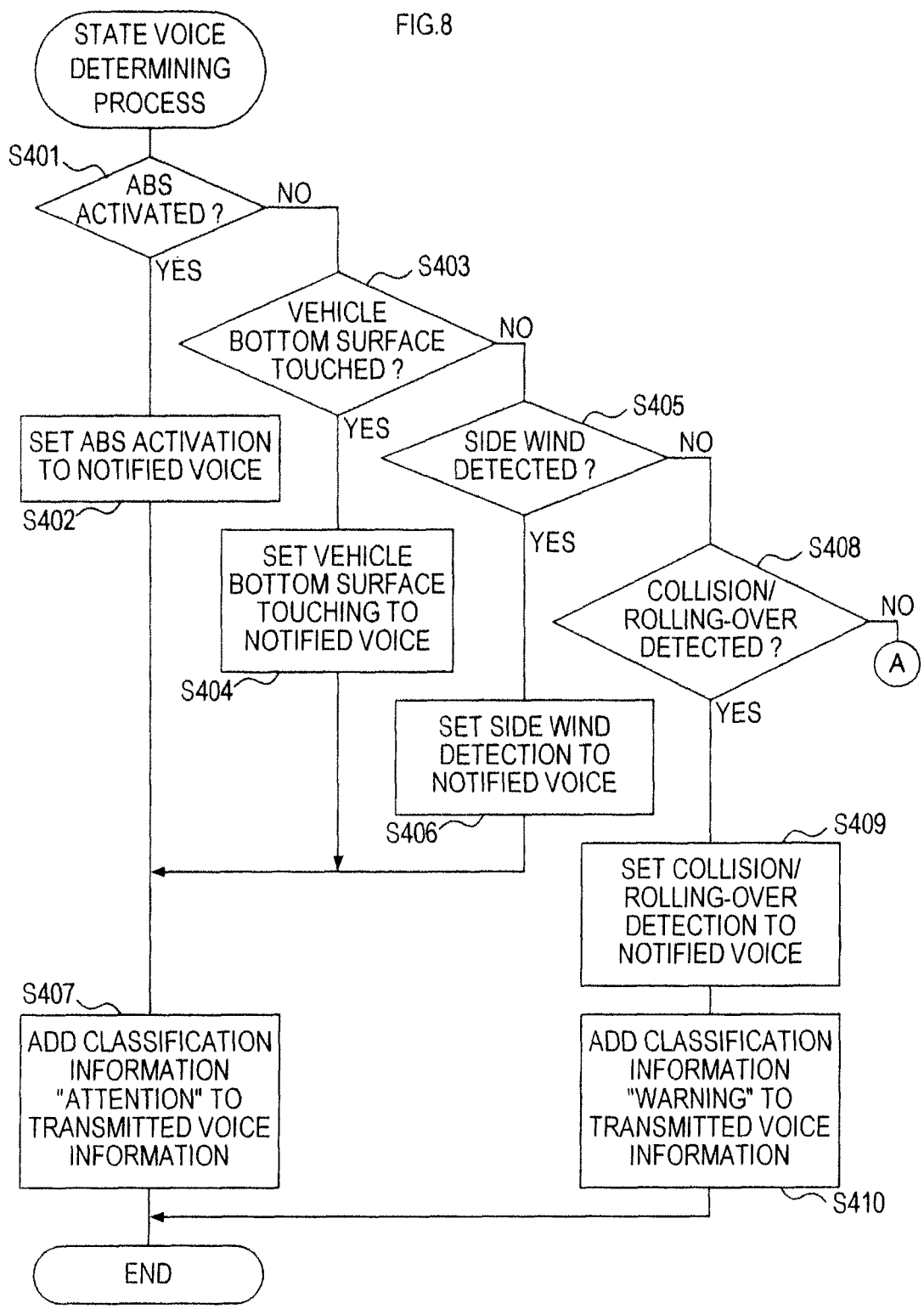
FIG. 8 is a flowchart illustrating a state voice determining process.

FIG. 8 is a flowchart illustrating an example of the state voice determining process. In this example, the ABS activating state, a touching state of a vehicle bottom surface with a road level difference and so on or a highly likely touching state therebetween, a detected state of a strong side wing against a vehicle, a vehicle collision or rolling-over fall into the specific state of S112.

First, the CPU 41 determines based upon a notification signal outputted from the ABSECU 51 whether the ABS is activated (S401). When the CPU 41 determines the presence of the ABS activation (S401: YES), a voice including contents notifying the ABS activation (e.g., a voice such as "ABS was activated.", "Attention to slip.", or the like) is set to the transmitted voice information (S402).

Meanwhile, when the CPU 41 determines the absence of the ABS activation (S401: NO), the CPU 41 determines whether a touching state of a vehicle bottom surface with a road level difference and so on or a highly likely touching state therebetween is detected (S403), by the bottom surface sensor 57. When the CPU 41 determines the presence of detection of the touching state or highly likely touching state (S403: YES), a voice including contents notifying a chance of scratching the vehicle bottom (e.g., a voice such as "A vehicle bottom surface may be scratched.", "There is a level difference.", or the like) is set to the transmitted voice information (S404).

Meanwhile, when the CPU 41 determines the absence of detection of the touching state or highly likely touching state (S403: NO), the CPU 41 determines by the side wind sensor 58 whether a strong side wind against a vehicle is detected (S405). When the CPU 41 determines the presence of detection of a strong side wind (S405: YES), a voice including contents notifying detection of a strong side wing (e.g., a voice such as "Attention to side wind." or the like) is set to the transmitted voice information (S406).

In any of the steps, when the CPU 41 determines the presence of the ABS activation (S401: YES), when the CPU 41 determines the presence of detection of the touching state of the vehicle bottom surface with the road level difference and so on or the highly likely touching state (S403: YES), and when the CPU 41 determines the presence of detection of a strong side wind (S405: YES), the transmitted voice information is classified into the "attention", the classification information indicating the "attention" is set to be added to the transmitted voice information (S407). Sequentially, the CPU 41 terminates the state voice determining process, and the process proceeds to S114 (FIG. 5B) as described below.

Meanwhile, when the CPU 41 determines the absence of detection of a strong side wind (S405: NO), the CPU 41 determines by the collision/roll-over sensor 59 whether a vehicle collision or rolling-over (a state where a vehicle highly possibly encountered an accident) is detected (S408). When the CPU 41 determines the presence of detection of a vehicle collision or rolling-over (S408: YES), a voice including contents notifying the vehicle collision or rolling-over (e.g., a voice such as "Vehicle collision (rolled over)", "Car accident occurred.", or the like) is set to the transmitted voice information (S409). The transmitted voice information is classified into the "warning", and the classification information indicating the "warning" is set to be added to the transmitted voice information (S410). Subsequently, the CPU 41 terminates the state voice determining process, and the process proceeds to S114 (FIG. 5B) as described below.

When the CPU 41 determines the absence of the vehicle collision or rolling-over (S408: NO), the process returns to S101 (FIG. 5A).

Returning to FIG. 5B, in S114, the CPU 41 obtains location information by requesting the navigation device 48 for the location information and sets this location information to be added to the transmitted voice information. The location information is information that indicates, with an absolute position (latitude, longitude, etc.), a current position of the navigation device 48 at the time of obtaining the location information (in other words, a vehicle current position, a current position of the terminal device 31 to 33, a user current position). Particularly, the location information obtained in S114 indicates a position where a user uttered the voice (utterance position). The utterance position may be used to identify the position where the user uttered the voice, and occurrence of some variation is of no matter, which may be generated due to a time gap between a voice inputting timing and a location information obtaining timing (a position variation associated with a vehicle travel), and the like.

Subsequently, the CPU 41 produces a voice packet having, as transmitted data, transmitted voice information, emergency information, location information, operation information, classification information, and information including user nicknames set in an authentication process described below (S115). The CPU 41 wireless transmits the voice packet produced to a communication partner's device (i.e., server 10 or the other terminal device(s) 31 to 33) (S116) and terminates the voice transmitting process. That is, the transmitted voice information indicating the user uttering voice is transmitted in a manner by which the emergency information, location information (utterance position), operation information, classification information, and nickname are identified (in a manner that each of them are made to correspond). All voice packets are transmitted to the server 10, and a specific voice packet (for example, a packet including transmitted voice information to which the "attention" or "warning" is added as the classification information) may be transmitted also to the other terminal device(s) 31 to 33 that the terminal device 31 to 33 is able to directly communicate.

Figure 9:
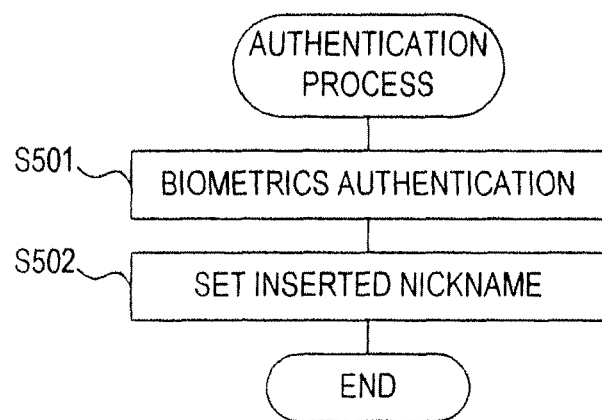
FIG. 9 is a flowchart illustrating authentication process.

The terminal device 31 to 33 performs the authentication process as illustrated in FIG. 9 at a time of activation or when a user inputs a specific operation. The authentication process identifies a user who inputs a voice.

As illustrated in FIG. 9, in the authentication process, the CPU 41 first obtains, via the input portion 45 of the terminal device 31 to 33, a user biological feature (e.g., either fingerprint, retina, palm, or voiceprint) (S501). The CPU 41 refers to a database making the user name (ID) pre-stored in a memory such as RAM correspond to the biological feature to identify a user and sets the user nickname to be inserted into a voice (S502). When such processes are ended, the authentication process is terminated.

Described below is the voice delivering process with references to flowcharts in FIGS. 10A to 10C. In the voice delivering process, the server 10 applies a predetermined operation (process) to the voice packet(s) transmitted from the terminal device(s) 31 to 33 and delivers a voice packet(s) obtained after the operation to the other terminal device(s) 31 to 33.

Specifically, as illustrated in FIGS. 10A to 10C, the sever 10 determines whether the voice packet transmitted from the terminal device 31 to 33 is received (S701). When there is no receipt of the voice packet (S701: NO), the process proceeds to S725 as described below.

When there is some receipt of the voice packet (S701: YES), the server 10 obtains this voice packet (S702) and adds a nickname to the voice packet by reference to the username/nickname DB (S703). In this process, the server 10 produces a new voice packet obtained by adding, by voice, a nickname being identification information to distinguish the user to the voice packet inputted by the user. Here, the nickname is added in front or at the end of the user input voice so that the user input voice does not overlap the nickname.

Subsequently, the server 10 converts a voice of voice information included in the new voice packet to characters (S704). In this process, a known process is employed, by which the voice is converted to characters readable by other users. Here, the location information, the operation information, and so on are also converted to character data. In the event where the conversion process from voice to characters is implemented by the terminal device 31 to 33 being a voice packet transmission source, the server 10 obtains the character data obtained by the conversion process from the terminal device 31 to 33, whereby the conversion process by the server 10 may be omitted (or simplified).

Next, the server 10 extracts a name (personal name) from the voice (or converted character data) and determines whether there is a name in the voice (S705). In the event where emergency information is contained in the voice packet, the processes from S705 to S720 are omitted, the process proceeds to S721 as described below.

When there is no name in the voice (S705: NO), the process proceeds to S709 as described below. When there is a name in the voice (S705: YES), the server 10 determines whether the name exists in the username/nickname DB (S706). When the name contained in the voice exists in the username/nickname DB (S706: YES), the name is replaced, by voice, to a nickname corresponding to the name (for character data, converts the name to a nickname with characters) (S707). The process then proceeds to S709.

When the name contained in the voice does not exist in the username/nickname DB (S706: NO), the name is replaced with a sound "Beep" (for character data, converts the name to another characters such as "*" etc.) (S708). The process then proceeds to S709**.

Next, the server 10 extracts a predetermined forbidden word contained in the voice (or converted character data) (S709). Regarding the forbidden words, words that may be generally considered to be uncivilized, dirty, etc. and possibly make listeners feel unpleasant are registered in the forbidden word DB. In this process, a forbidden word is extracted by matching the word contained in the voice (or converted character data) against the forbidden words stored in the forbidden word DB.

The forbidden word is replaced with a sound "Boo" (for character data, replace the name with other characters "XXX" etc.) (S710). The server 10 then carries out an intonation checking or politeness expression checking (S711, S712).

In these steps, the server 10 determines a user emotion when the user inputted the voice, whether the user uttered politely, or the like, by detecting, from the voice information, the amplitude of an input to the microphone 52 (absolute value or variation) or the politeness expression contained in the voice. The server 10 then detects whether the user was feeling emotionally overwrought or whether the user was speaking impolitely.

As a result of checking, when the input voice is based upon a normal emotion and a polite way of speaking, (S713: YES), the process proceeds immediately to S715 as described below. As a result of checking, when the input voice is based upon an excited emotion or an impolite way of speaking (S713: NO), the server 10 sets a voice delivery prohibition flag indicating prohibition of delivery of this voice packet (S714). The process then proceeds to S715.

Subsequently, the server 10 identifies the behavior of the terminal device 31 to 33, from which the voice packet was transmitted, by tracking the location information and determines whether the behavior of the terminal device 31 to 33 digresses from the main road or whether the behavior of the terminal device 31 to 33 has stopped more than a predetermined period of time (e.g., approximately 5 minutes) (S715).

When the server 10 determines that the behavior of the terminal device 31 to 33 digresses from the main road or has stopped (S715: YES), the server 10 assumes that the user of the terminal device 31 to 33 is taking a rest and sets a rest flag (S716). The process then proceeds to S717. When the behavior of the terminal device 31 to 33 does not fall in the digression from the main road or a stop, (S715: NO), the process proceeds immediately to S717.

The server 10 then sets a predetermined terminal device (for example, all terminal devices powered on, a part of terminal devices extracted based upon settings, etc.) as a communication partner (S717) and notifies the terminal device 31 to 33 being the voice transmitting source of the results of the improper word (for example, the result of the presence or absence of names or forbidden words, the results of intonation checking, politeness expression checking, and so on) (S718).

Subsequently, the server 10 determines whether the positions of the terminal devices 31 to 33 for delivery (i.e., delivery-destination vehicle) went past a specific position (S719). Here, in the server 10, a plurality of advertisements is pre-registered in the advertisement DB in which areas to be delivered with advertisements are set every advertisement. In this process, the server 10 detects an entry of the terminal device 31 to 33 into an area in which an advertisement (CM) is delivered.

When the server 10 determines that the delivery-destination vehicle went past the specific position (S719: YES), the server 10 adds an advertisement corresponding to the specific position into the voice packet to be transmitted to the terminal device 31 to 33 (S720). When the server 10 does not determine that the delivery-destination vehicle has gone past the specific position (S719: NO), the process proceeds to S721.

Subsequently, the server 10 determines whether there is a plurality of voice packets to be delivered (S721). When there is a plurality of voice packets (S721: YES), the voice packets are arranged not to overlap each other (S722), and the process proceeds to S723. In this process, the voice packets are arranged so as to prioritize reproduction of the emergency information and so as to bring a voice packet having the rest flag later in an order.

When there is one voice packet (S721: NO), the process proceeds immediately to S723. Sequentially, the server 10 determines whether the voice packet is already being transmitted (S723).

When the voice packet is being transmitted (S723: YES), the server 10 operates to transmit a voice packet to be transmitted after the voice packet being transmitted (S724). The process then proceeds to S726. When the voice packet is not being transmitted (S723: NO), the process then proceeds immediately to S726.

In S725, the server 10 determines the presence or absence of a voice packet to be transmitted (S725). When there is a voice packet (S725: YES), the server 10 transmits the voice packet to be transmitted (S726) and terminates the voice delivering process. When there is no voice packet (S726: NO), the server 10 terminates the voice delivering process.

Described below is the voice reproducing process to reproduce a voice, which is implemented by the CPU 41 of the terminal device 31 to 33, with reference to the flowcharts illustrated in FIGS. 11A and 11B. In the voice reproducing process, as illustrated in FIGS. 11A and 11B, the CPU 41 first determines whether the terminal device 31 to 33 has received a packet from other devices, such as the other terminal device(s) 31 to 33, the server 10 or the like (S801). When the CPU 41 determines the absence of packet receipt (S801: NO), the voice reproducing process is terminated.

When the CPU 41 determines the presence of packet receipt (S801: YES), the CPU 41 determines whether this packet is a voice packet (S802). When this packet is not a voice packet (S802: NO), the process proceeds to S812 as described below.

When this packet is a voice packet (S802: YES), the CPU 41 stops reproducing voice information being reproduced at present and erases the voice information being reproduced (S803). The CPU 41 determines whether a delivery prohibition flag has been set (S804). When the delivery prohibition flag has been set (S804: YES), the CPU 41 produces a voice message indicating prohibition of voice reproduction (registered in advance in a memory such as ROM) and produces a character message corresponding to this voice message (S805).

Subsequently, in order to make it easy to hear the voice, the CPU 41 turns off a volume of music sound being reproduced by the audio apparatus 50 (S806). Here, the volume of reproduction sound may be reduced or the reproducing itself may be stopped.

Subsequently, the CPU 41 performs a speaker setting process to set a volume of sound outputted when the voice is reproduced from the speaker 53, in response to a positional relationship between the position of the terminal device 31 to 33 being a transmitting source of the voice to be reproduced (utterance position) and the position of the terminal device 31 to 33 itself (current position) (S807). The CPU 41 then reproduces (starts reproducing) the voice message produced in S805 at the sound volume set (S808). Here, the CPU 41 outputs character data including the character message to be displayed on the display of the navigation device 48 (S812).

The character data displayed in this process includes character data indicating contents of a voice representing the voice information contained in the voice packet, character data indicating contents of operation by a user, and a voice message.

In S804, when the delivery prohibition flag is not set (S804: NO), the CPU 41 turns off a volume of reproducing sound, such as music being reproduced by the audio apparatus 50, in the same manner as S806 as described above (S809). Further, the CPU 41 performs the speaker setting process (S810) and reproduces a voice representing the voice information contained in the voice packet (S811). The process then proceeds to S812. The voice representing the voice information is a synthetic voice, so that a reproduction mode may be changed easily. For example, playback speed adjustment, inhabitation of emotional components contained in a voice, intonation adjustment, tone adjustment, etc., may be altered by a user operation or automatically.

In S811, it is assumed that the voice packets do not overlap because voices representing the voice information contained in the voice packets arranged are reproduced in order. However, for example, when voice packets are received from a plurality of servers 10, the voice packets may overlap. In this case, the process in S722 as described above (process arranging voice packets) may be performed.

Subsequently, the CPU 41 determines whether a voice indicating a command is inputted by a user (S813). According to the embodiment, when a voice indicating a command to skip a voice being reproduced (e.g., a voice "cut") is inputted while the voice is being reproduced (S813: YES), the CPU 41 skips the voice information currently being played on a predetermined unit basis and reproduces the next voice information (S814). That is, a voice that a user does not feel like hearing may be skipped by the voice operation. The predetermined unit basis herein may refer to an utterance (comment) unit, a speaker unit, and so on. When voice reproducing for all the voice information received are completed (S815: YES), the CPU 41 returns the volume of music sound being played by the audio apparatus 50 to an on state (S816) and terminates the voice reproducing process.

Figure 12:
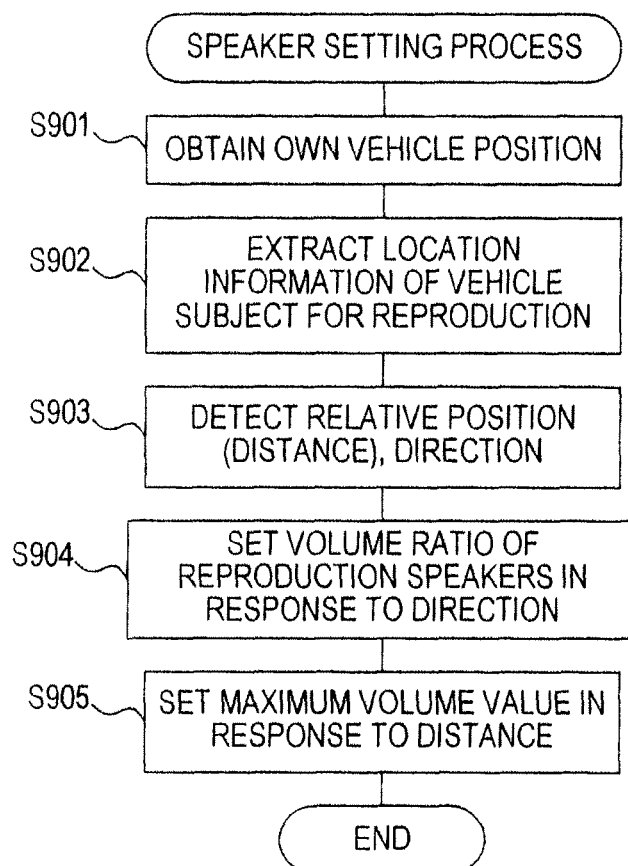
FIG. 12 is a flowchart illustrating a speaker setting process.

Described below are details on the speaker setting process implemented in S807 and S810, with reference to FIG. 12. FIG. 12 is a flowchart illustrating the speaker setting process of the voice reproducing process. In the speaker setting process, as illustrated in FIG. 12, the CPU 41 obtains location information indicating an own vehicle position (inclusive of past location information) from the navigation device 48 (S901).

Subsequently, the CPU 41 extracts location information (utterance position) contained in a voice packet subject to be reproduced (S902). The CPU 41 detects a position(s) (distance(s)) of the other terminal device(s) 31 to 33 relative to a motion vector of the own vehicle (S903). In this process, the CPU 41 detects a direction, in which a terminal device being a transmitting source of a voice packet to be reproduced is located, and a distance to this terminal device, with reference to a traveling direction of its own terminal device 31 to 33 (vehicle).

Subsequently, the CPU 41 adjusts volume ratios of the speakers in response to the direction in which the terminal device being the voice packet transmitting source is located (S904). In this process, to be able to hear the voice from the direction in which the terminal device being the transmitting source is positioned, the volume ratios are set so that a volume of the speaker positioned in the direction in which this terminal device is positioned becomes the largest.

The CPU 41 sets the largest volume for the speaker having the largest volume ratio in response to the distance to the terminal device being the voice packet transmitting source (S905). According to this process, the volumes for the other speakers may be set based upon the volume ratio. When such process is ended, the speaker setting process is terminated.

Figure 13:
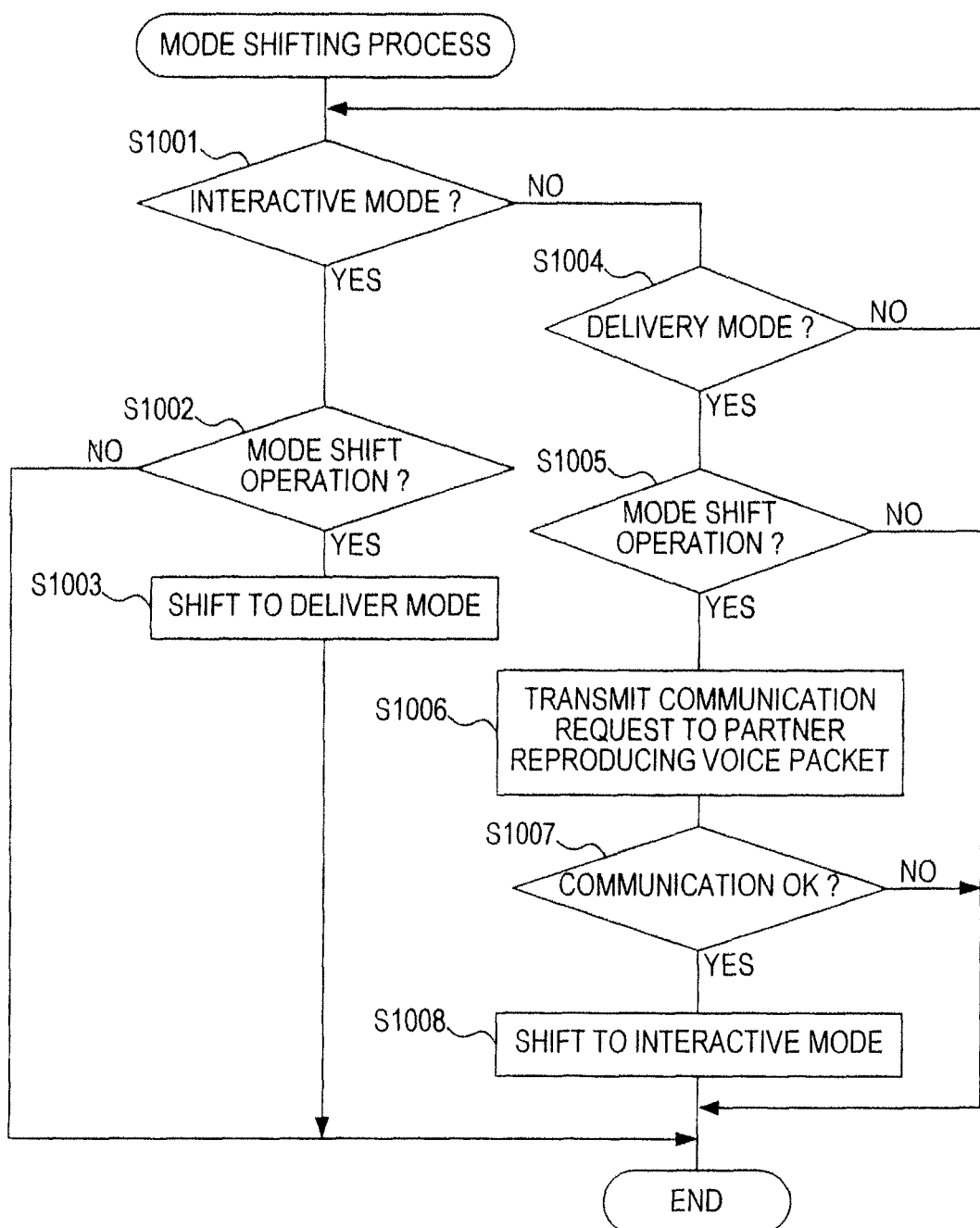
FIG. 13 is a flowchart illustrating a mode shifting process.

Described below is a mode shifting process. FIG. 13 is a flowchart illustrating the mode shifting process implemented by the CPU 41 of the terminal device 31 to 33. The mode shifting process is a process to switch a delivery mode among an unspecified large number of communication partners and an interactive mode with a specific communicating partner. The mode shifting process is started when the terminal device 31 to 33 is powered on and is repetitively performed after that.

FIG. 13 describes details of the mode shifting process. The CPU 41 determines what the current set mode is between the interactive mode and the delivery mode (S1001, S1004). When the set mode is none of the interactive mode or the delivery mode (S1001: NO, S1004: NO), the process returns to S1001.

When the set mode is the interactive mode (S1001: YES), the CPU 41 determines the presence or absence of a mode shift operation via the input portion 45 (S1002). When the CPU 41 determines the absence of the mode shift operation (S1002: NO), the mode shifting process is ended.

When the CPU 41 determines the presence of the mode shift operation (S1002: YES), the set mode shifts to the deliver mode (S1003). Here, the CPU 41 notifies the server 10 to set the communication partner to an unspecified large number of people. The server 10 receives this notification and changes the communication partner setting for this terminal device 31 to 33 (descriptions in the communication partner DB).

When the set mode is the delivery mode (S1001: NO, S1004: YES), the CPU 41 determines the presence or absence of the mode shift operation via the input portion 45 (S1005). When the CPU 41 determines the absence of the mode shift operation (S1005: NO), the mode shifting process is ended.

When the CPU 41 determines the presence of the mode shift operation (S1005: YES), the CPU 41 transmits a communication request to a partner who is reproducing the voice packet (S1006). In details, the CPU 41 specifies the voice packet (i.e., terminal device being the transmitting source of the voice packet) and transmits the communication request to the server 10. The server 10 transmits the communication request to the corresponding terminal device. The server 10 then receives a response to the communication request from the terminal device and transmits the response to the terminal device 31 to 33 being a communication requestor.

With the terminal device 31 to 33, when there is a response that the communication request is accepted (S1007: YES), the set mode is switched to the interactive mode in which the terminal device that accepted the communication request is a communication partner (S1008). Here, The CPU 41 notifies the server 10 to set a communication partner to a specific terminal device. The server 10 receives the notification and changes the setting of the communication partner.

When there is no response that the communication request is accepted (S1007: NO), the mode shifting process is terminated.

Figure 14:
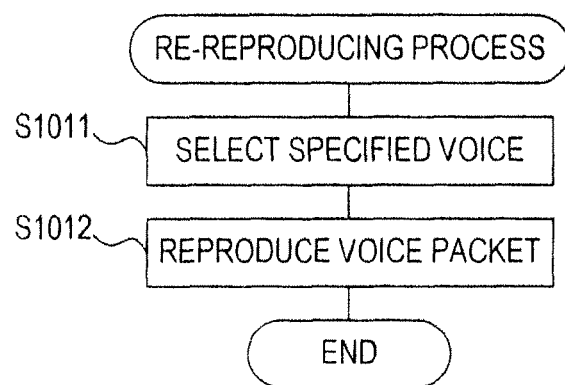
FIG. 14 is a flowchart illustrating a re-reproducing process.

FIG. 14 is a flowchart illustrating a re-reproducing process implemented by the CPU 41 of the terminal device 31 to 33. The re-reproducing process is an interruption process started when a re-reproducing operation is inputted to repetitively reproduce while a voice representing voice information contained in a voice packet is being reproduced. The voice reproducing process is discontinued to implement this re-reproducing process.

In this re-reproducing process, as illustrated in FIG. 14, the CPU 41 first selects either a specified voice packet (S1011). In this process, the CPU 41 selects a voice packet being reproduced or a voice packet immediately after reproduction (within a reference period of time (e.g., 3 seconds) after the reproduction finished) in response to an elapsed time after the reproduction start of the voice packet currently being reproduced.

Subsequently, the CPU 41 reproduces the selected voice packet from the beginning (S1012), and the re-reproducing process is terminated. When this process is terminated, the voice reproducing process is started again.

The server 10 may receive voice packets transmitted from the terminal device(s) 31 to 33 to accumulate voice information. In this case, in the event where the server 10 receives a request from the terminal device 31 to 33, the server 10 may extract, from among the accumulated voice information, voice information corresponding to the terminal device 31 to 33 being a requestor and may transmit the voice information extracted.

Figure 15:
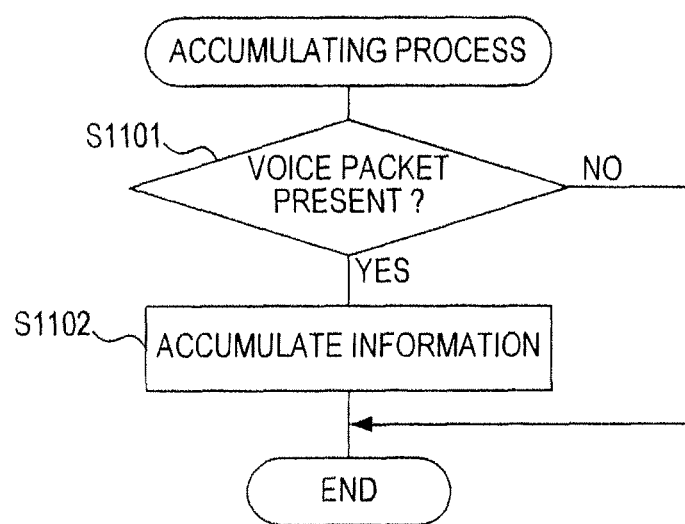
FIG. 15 is a flowchart illustrating an accumulating process.

FIG. 15 is a flowchart illustrating an accumulating process implemented by the CPU 11 of the server 10. The accumulating process is a process to accumulate (store) voice packets transmitted from the terminal devices 31 to 33 through the above-described voice transmitting process (FIGS. 5A and 5B). The accumulating process may be performed in substitution for the above-described voice delivering process (FIGS. 10A to 10C) or may be performed with the voice delivering process (e.g., concurrently).

In the accumulating process, the CPU 11 determines whether the server 10 receives a voice packet transmitted from the terminal device 31 to 33 (S1101). When a voice packet is not received (S1101: NO), the accumulating process is terminated.

When the voice packet is received (S1101: YES), the CPU 11 accumulates the voice packet received in the database 14 (S1102). Specifically, the CPU 11 accumulates the voice packet in a manner that the voice information is retrieved based upon various information contained in the voice packet (e.g., voice information, emergency information, location information, operation information, classification information, user nickname, and so on). The accumulating process is then terminated. Voice information satisfying a predetermined erasure condition (e.g., old voice information, voice information of disconnected users, and so on) may be erased from the database 14.

Figure 16:
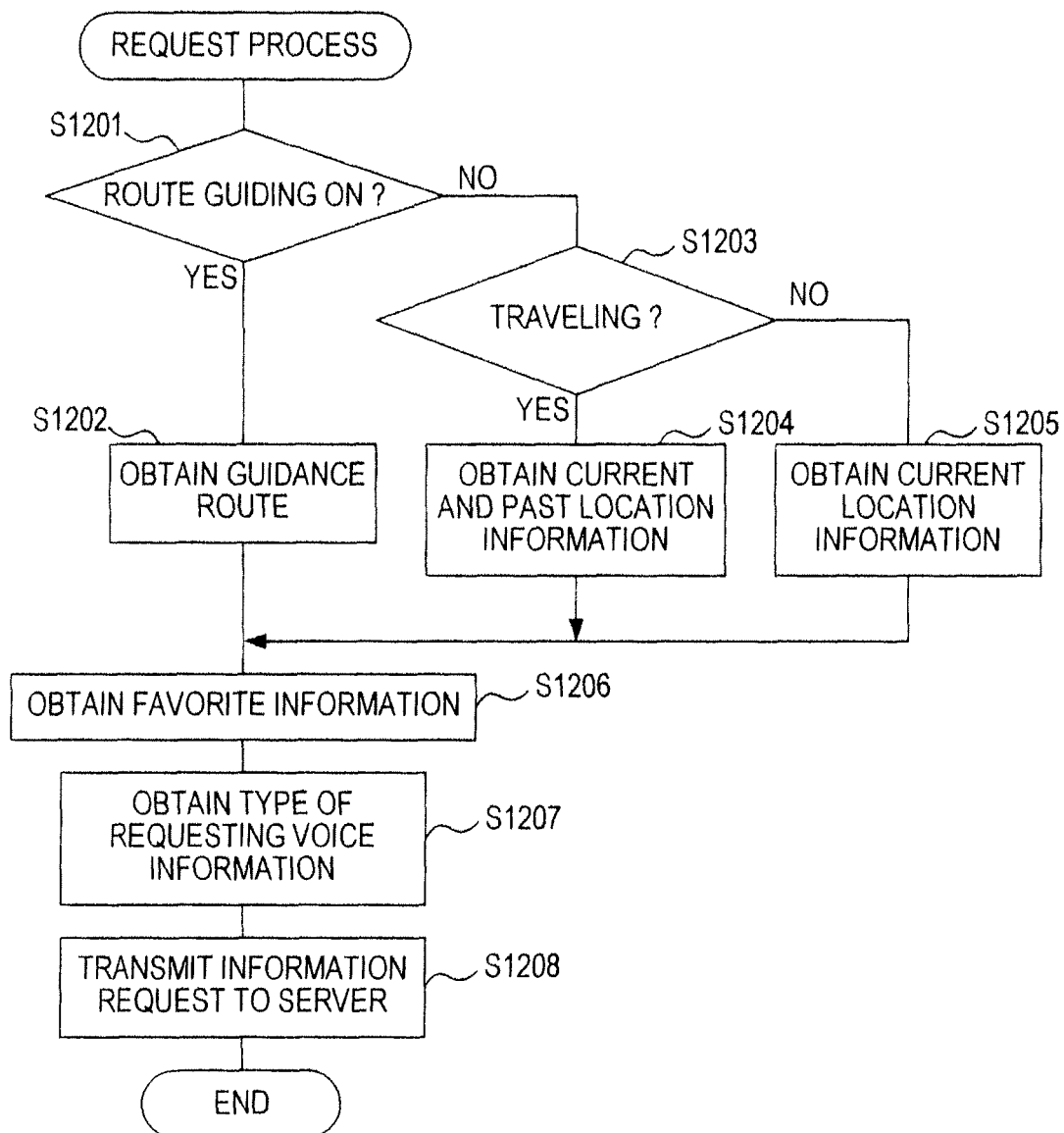
FIG. 16 is a flowchart illustrating a request process.

FIG. 16 is a flowchart illustrating a request process implemented by the CPU 41 of the terminal device 31 to 33. The request process is performed every predetermined time (e.g., several tens of seconds or several minutes).

In the request process, the CPU 41 determines whether a route guiding process has been performed by the navigation device 48 (in other words, whether a guidance route to a destination has been set) (S1201). When the CPU 41 determines that the route guiding process has been performed (S1201: YES), the CPU 41 obtains, from the navigation device 48 as vehicle location information, location information (current location information) indicating the own vehicle position and guidance route information (information on a destination and a route to the destination) (S1202). Subsequently, the process proceeds to S1206. The vehicle location information is information to set a peripheral area described below in the server 10.

Meanwhile, when the CPU 41 determines that the route guiding process has not been performed (S1201: NO), the CPU 41 determines whether a vehicle is traveling (S1203). Specifically, when a vehicle travel speed exceeds a determination reference value, the CPU 41 determines that the vehicle is running. This determination reference value is set to be higher than a general speed when turning to the left or right (lower than a speed when driving straight). Therefore, when the vehicle is determined to be running, there is a high possibility that a vehicle traveling direction does not remarkably change. In other words, in S1203, the CPU 41 determines whether it is a travel state where a traveling direction is predicted easily based upon variations in the vehicle location information. However, it is not limited hereto, and, for example, zero or a value close to zero may be set as the determination reference value.

When the CPU 41 determines that the vehicle is running (S1203: YES), the CPU 41 obtains, from the navigation device 48 as vehicle location information, location information indicating an own vehicle position (current location information) and one or more past location information (S1204). Subsequently, the process proceeds to S1206. In the event where a plurality of past location information is obtained, the location information based upon the same time interval, such as location information before five seconds, location information before ten seconds, may be obtained.

Meanwhile, when the CPU 41 determines that the vehicle is not running (S1203: NO), the CPU 41 obtains, from the navigation device 48 as the vehicle location information, location information indicating the own vehicle position (current location information) (S1205). Subsequently, the process proceeds to S1206.

Subsequently, the CPU 41 obtains favorite information (S1206). The favorite information is information that a user can use to extract (retrieve) voice information that the user needs from among multiple voice information and is set manually by the user or automatically (e.g., by analyzing preferences based upon the user utterance). For example, when a specific user (e.g., a predetermined user) is set as the favorite information, voice information transmitted by the specific user is extracted as priority. In the same manner, for example, when a specific keyword is set as the favorite information, voice information containing the specific keyword is extracted as priority. In this S1206, already set favorite information may be obtained or a user may set favorite information at this stage.

Subsequently, the CPU 41 obtains a type (category) of user-requesting voice information (S1207). The type herein refers to types classified in S109 as described above (according to the embodiment, "normal", "attention", and "warning").

Subsequently, the CPU 41 transmits to the server 10 information request including: vehicle location information; favorite information; a type of voice information; and an own ID (of terminal device 31 to 33) (information for the server 10 to specify a replay destination). The request process is then terminated.

FIGS. 17A and 17B are flowcharts illustrating the response process implemented by the CPU 11 of the server 10. The response process is a process to respond to the information request transmitted from the terminal device 31 to 33 in the above-described request process (FIG. 16). The response process may be performed in substitution for the above-described voice delivering process (FIGS. 10A to 10C) or may be performed with the voice delivering process (e.g., concurrently).

In the response process, the CPU 11 first determines whether an information request transmitted from the terminal device 31 to 33 is received (S1301). When the CPU 11 determines that the information request has not been received (S1301: NO), the response process is terminated.

When the CPU 11 determines that the information request is received (S1301: YES), the CPU 11 sets a peripheral area corresponding to a vehicle location information contained in the information request received (S1302 to S1306). According to the embodiment, as described above (S1201 to S1205, S1208), either location information indicating an own vehicle position (P1), location information indicating an own vehicle position and one or more past location information (P2), or location information indicating an own vehicle position and guidance route information (P3) is offered as the vehicle location information.

Figure 18:
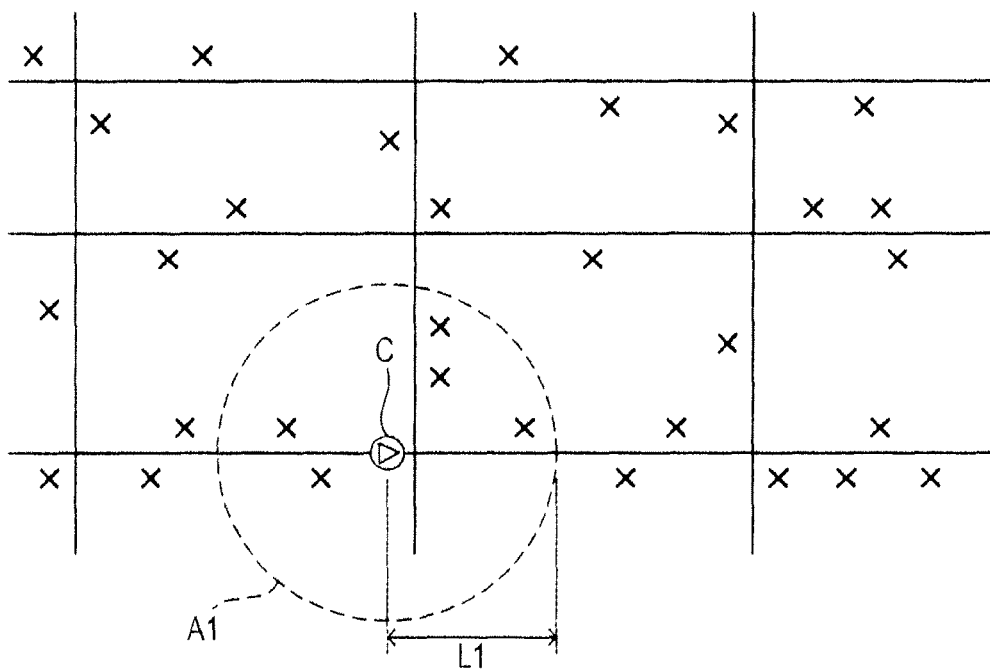
FIG. 18 is a view illustrating a peripheral area set within a predetermined distance from an own vehicle position.

When the CPU 11 determines that the vehicle location information included in the information request received is the location information indicating the own vehicle position (P1) (S1302: YES), as illustrated in FIG. 18, an area A1 within a predetermined distance L1 from an own vehicle position (vehicle current position) C is set as the peripheral area (S1303). Subsequently, the process proceeds to S1307. In FIG. 18, the horizontal and vertical lines denote roads that the vehicle is allowed to run, and the symbols "x" denote utterance positions of the voice information accumulated in the server 10.

Figure 19:
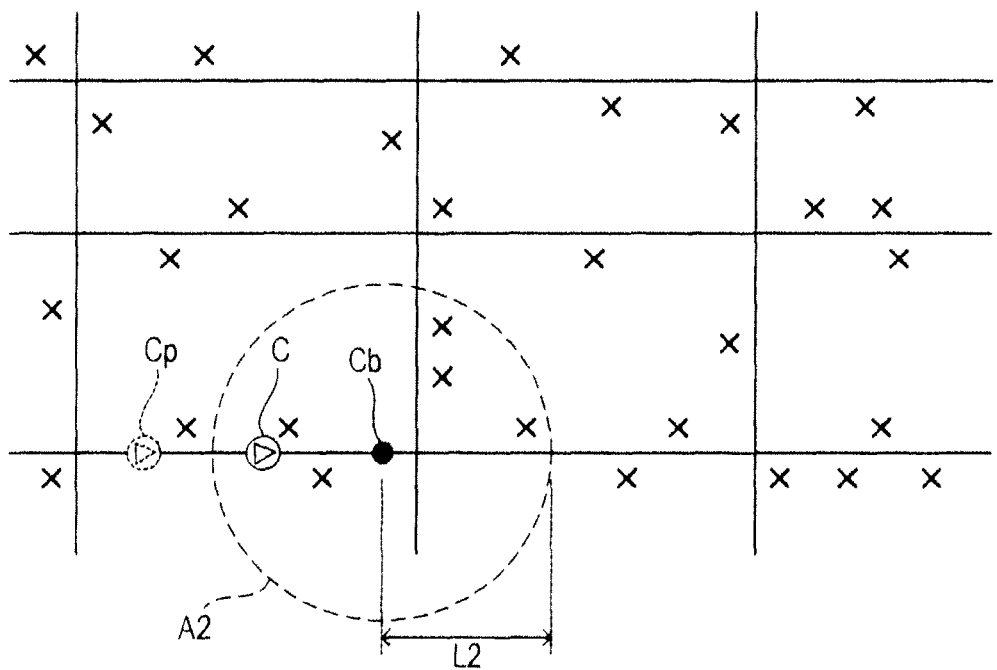
FIG. 19 is a view illustrating a peripheral area set within a predetermined distance from a reference position.

Meanwhile, when the CPU 11 determines that the vehicle location information included in the information request received is the location information indicating the own vehicle position and one or more past location information (P2) (S1302: NO, S1304: YES), as illustrated in FIG. 19, an area A2 within a predetermined distance L2 from a reference position Cb deviated from the own vehicle position (vehicle current position) C to the traveling direction side (right side in FIG. 19) is set as the peripheral area (S1305). The process then proceeds to S1307.

Specifically, the vehicle traveling direction is estimated based upon a positional relationship between the current location information C and the past location information Cp. A distance between the current position C and the reference position Cb may be greater than a radius L2 of the area. That is, an area A2 not including the current position C may be set as the peripheral area.

Meanwhile, when the CPU 11 determines that the vehicle location information included in the information request received is the location information indicating the own vehicle position and the guidance route information (P3) (S1304: NO), the CPU 11 sets an area along the scheduled driving route as a peripheral area (S1306). The process then proceeds to S1307.

Figure 20:
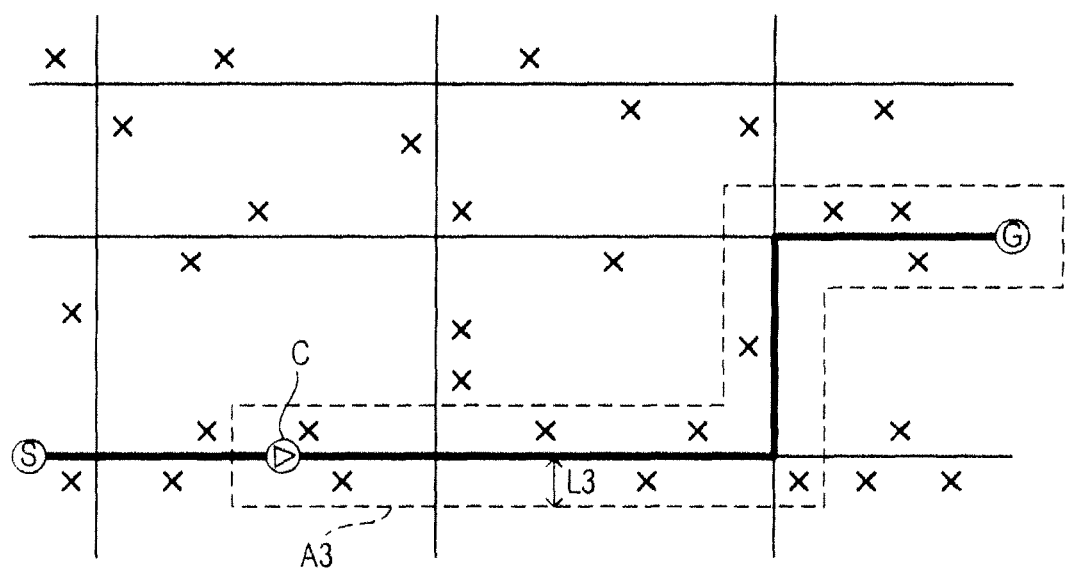
FIG. 20 is a view illustrating a peripheral area set along an scheduled driving route.

Specifically, as illustrated in FIG. 20 for example, an area A3 along the route from the current position C to a destination G (area judged to be on the route) out of the scheduled driving route (thick line) from the starting point S to the destination G is set to the peripheral area. Here, the area along the route may be, for example, an area within a predetermined distance L3 from the route. In this case, the value of L3 may be changed depending on the road attribute (e.g., road width or type). Further, the area does not have to be an area to the destination G and may be an area within a predetermined distance L4 from the current position C. Here, the route where the vehicle had run (route from the starting point S to the current position C) is excluded, but not limited hereto, and may be included.

Subsequently, the CPU 11 extracts, from among the voice information stored in the database 14, voice information of which the utterance position is within the peripheral area (S1307). According to the examples in FIGS. 18 to 20, voice information of which the utterance position is within the peripheral area A1, A2 or A3 (region surrounded by a broken line) is extracted.

Subsequently, the CPU 11 extracts, from the voice information extracted in S1307, voice information corresponding to the voice information type included in the information request received (S1308). The CPU 11 further extracts, from the voice information extracted in S1308, voice information corresponding to the favorite information included in the information request received (S1309).

Through the above-described processes (S1302 to S1309), the voice information corresponding to the information request received from the terminal device 31 to 33 is extracted as voice information as a transmission candidate to be transmitted to the terminal device 31 to 33 being the transmitting source of the information request.

Subsequently, the CPU 11 analyzes the contents of a voice with respect to each of the voice information of the transmission candidate (S1310). Specifically, the CPU 11 converts the voice representing the voice information into text (character data) and extracts a keyword contained in the text after conversion. The CPU 11 may store in the database 14 the text (character data) describing the contents of the voice information along with the voice information, and the information stored may be utilized.

Subsequently, the CPU 11 determines whether each of the voice information of the transmission candidates overlap the contents of the other voice information (S1311). For example, in the event where a keyword contained in certain voice information A matches, more than a predetermined ratio (e.g., half or more), with a keyword contained in another voice information B, the CPU 11 determines that the contents of the voice information A and B overlap. Here, the determination of overlapping may be carried out not based upon the keyword ratio but based upon the context, etc.

When the CPU 11 determines that all of the voice information of the transmission candidates do not overlap the contents of the other voice information (S1311: NO), the process proceeds to S1313. The CPU 11 transmits the voice information of the transmission candidate(s) to the terminal device 31 to 33 being the information request transmission source (S1313), and the response process is terminated. The voice information already transmitted may be stored for each of the terminal device 31 to 33 being a transmission destination, and the voice information already transmitted may be controlled not to be transmitted.

Meanwhile, when the CPU 11 determines that there is voice information, in the voice information being the transmission candidates, of which the contents overlap contents of the other voice information (S1311: YES), from among the voice information of which the contents overlap, voice information other than one voice information to be left as voice information being the transmission candidate is excluded from the voice information being the transmission candidates, so that the contents overlapping is resolved (S1312). For example, the newest voice information may be left from among the plurality of voice information of which the contents overlap. To the contrary, the oldest voice information may be left. For another example, voice information which includes the largest number of keywords may be left. Subsequently, the voice information being the transmission candidate is transmitted to the terminal device 31 to 33 being the information request transmitting source (S1313). The response process is then terminated.

The voice information transmitted from the server 10 to the terminal device 31 to 33 is reproduced by the above-described voice reproducing process (FIGS. 11A and 11B). When the terminal device 31 to 33 receives a new voice packet while a voice shown by the already received voice packet is being reproduced, the terminal device 31 to 33 gives priority to a voice representing a newly received voice packet and reproduces the same. The terminal device 31 to 33 does not reproduce a voice representing an old voice packet and erases the same. As a result, a voice representing voice information corresponding to a vehicle location is prioritized and reproduced.

Effects According to the Embodiment

According to the embodiment as described above, effects described below will be exhibited.

(1) The terminal device 31 to 33 inputs voice uttered by a user in a vehicle (S102) and obtains location information (current position) (S114). The terminal device 31 to 33 transmits, to the server 10 shared by the plurality of terminal devices 31 to 33, voice information signifying the voice inputted in a manner that the location information (utterance position) obtained at the time of voice inputting can be specified (S116). Further, the terminal device 31 to 33 receives, from the server 10, the voice information transmitted from the other terminal device(s) 31 to 33 to the server 10 and reproduces a voice representing the voice information received (S811). Specifically, the terminal device 31 to 33 reproduces the voice representing the voice information of which the utterance position is located in a peripheral area that is defined with reference to a current position (S1303, S1305, S1306), from among the voice information transmitted from the other terminal device(s) 31 to 33 to the server 10.

A user uttering voice at a certain place is often useful to other users existing at the same place (or heading to that place). Especially, the position of a user in a vehicle may remarkably vary in association with the time lapse (vehicle traveling), as compared with users not in vehicles. Accordingly, for users in vehicles, other users' voices uttered in the peripheral area defined with reference to the current position may be useful information.

According to the embodiment, a user of the terminal device 31 is allowed to hear a voice uttered within a peripheral area set with reference to the current position of the terminal device 31, from among voices uttered by users of the other terminal devices 32, 33 (the other vehicles). Accordingly, according to the embodiment, it is possible to offer useful information to users in vehicles.

The voice uttered in the peripheral area may include not only a real-time voice but also previous voices (e.g., uttered several hours ago). These voices may become useful information compared with real-time voices uttered outside the peripheral area (e.g., somewhere faraway). For example, in the event where a lane restriction and so on has been performed at a specific point on the road, a user's tweeting that information may allow other users heading to that specific point to select avoiding the specific point. Further, for example, when a user has beautiful scenery viewed from a specific point on the road, if the user tweets the information, other users heading to the specific point may not miss the scenery.

(2) When the terminal device 31 to 33 transmits, to the server 10 as the vehicle location information, past location information or scheduled driving route (scheduled traveling route) information in addition to the vehicle current location information, a peripheral area is set to an area deviating from the vehicle current position to the traveling direction side (FIGS. 19, 20). Therefore, it is possible to reduce voices uttered at the points where the vehicle has already passed from the reproduction target and to increase voices uttered at the points where the vehicle is now heading; as a result, it is possible to enhance information usability.

(3) When an area along the scheduled driving route is set as a peripheral area, it is possible to exclude voices uttered outside the area along the scheduled driving route, thereby enabling further enhancing information usability.

(4) The terminal device 31 to 33 automatically obtains vehicle location information every predetermined time (S1202, S1204, S1205) and transmits to the server 10 (S1208). Therefore, the terminal device 31 to 33 obtains voice information corresponding to the vehicle current position. Accordingly, even when the vehicle position varies in association with the vehicle traveling, the terminal device 31 to 33 may be able to obtain voice information corresponding to the position. Specifically, when the terminal device 31 to 33 receives new voice information from the server 10, the terminal device 31 to 33 erases voice information already received (S803) and reproduces the new voice information (S811). That is, the terminal device 31 to 33 updates voice information to be reproduced to voice information corresponding to the latest vehicle location information every predetermined period of time. Accordingly, voice to be reproduced can follow the changes in a vehicle position in association with the vehicle traveling.

(5) The terminal device 31 to 33 transmits to the server 10 vehicle location information including a vehicle current position and so on (S1208) and causes the server 10 to extract voice information corresponding to the current position and so on (S1302 to S1312). The terminal device 31 to 33 then reproduces a voice representing the voice information received from the server 10 (S811). Accordingly, compared with the structure in which the terminal device 31 to 33 extracts voice information, it is possible to reduce an amount of voice information received from the server 10.

(6) The terminal device 31 to 33 inputs voice uttered by a user (S102) and converts the voice inputted into synthetic voice (S107); that is, the voice is reproduced after being converted to the synthetic voice. Compared with the voice reproduced as it is, a reproduction mode is changed easily. For example, changes may be easily made, such as reproduction speed adjustment, inhabitation of emotional components contained in the words, intonation adjustment, tone adjustment, and so on.

(7) When a voice indicating a command is inputted while a voice is being reproduced, the terminal device 31 to 33 changes a reproduction mode for voice in response to the command. Specifically, when a voice indicating a command to skip a voice being reproduced is inputted (S813: YES), reproduction is performed by skipping the voice being reproduced on the predetermined unit basis (S814). Accordingly, it is possible to skip voice that a user does not feel like hearing on the predetermined unit basis, for example on the utterance (comment) unit basis, on the speaker unit basis, and so on.

(8) The server 10 determines whether the contents of each of the voice information of the transmission candidate overlap the contents of the other voice information (S1311). When the server 10 determines the overlapping (S1311: YES), the server 10 deletes voice information that overlaps (S1312). For example, if a plurality of users utter in the similar manner about the same phenomenon, such as utterance about an accident that occurred at a certain place, a phenomenon may be easily generated in which similar utterances are repetitively reproduced. For this point, according to the embodiment, since voices having overlapping contents are omitted from reproduction, such phenomenon, in which similar utterances are repetitively reproduced, may be suppressed.

(9) The server 10 extracts voice information corresponding to favorite information from among voice information being the transmission candidates (S1309) and transmits to the terminal device 31 to 33 (S1313). Accordingly, it is possible to efficiently extract voice information required by a user (satisfying a priority condition for each user) from among a great amount of voice information transmitted from other multiple users and to preferentially reproduce the voice information extracted.

(10) The terminal device 31 to 33 is configured to be able to communicate to an audio apparatus mounted on a vehicle and reduces the volume of the audio apparatus playing the voice compared with the volume before playing the voice (S806). Accordingly, it is possible to make the voice caught easily.

(11) The terminal device 31 to 33 detects whether a specific event on a vehicle occurred (S110, S112). When the terminal device 31 to 33 detects the occurrence of the specific event (S110: YES or S112: YES), the terminal device 31 to 33 transmits voice information signifying voice corresponding to the specific event to the other terminal devices 31 to 33 or the server 10 (S116). Further, the terminal devices 31 to 33 receives voice information from the other terminal devices 31 to 33 or the server 10 and reproduces the voice representing the voice information received (S811).

According to the embodiment, the user of the terminal device 31 can hear a voice corresponding to the specific event on the vehicle transmitted from the other terminal devices 32, 33 (different vehicles). Therefore, the user of the terminal device 31 to 33 can understand the conditions of the other vehicles while driving.

(12) The terminal device 31 to 33 detects, as the specific event, that a specific driving operation is performed by a vehicle user (S301, S303, S306). When the terminal device 31 to 33 detects the specific driving operation (S301: YES, S303: YES, or S306: YES), the terminal device 31 to 33 transmits voice information signifying a voice having the contents notifying that the specific driving operation was performed (S302, S304, S307, S116). Therefore, users of the terminal devices 31 to 33 may understand that another vehicle performed a specific driving operation while driving.

(13) When the terminal device 31 to 33 detects a sudden brake operation (S306: YES), the terminal device 31 to 33 transmits voice information signifying a voice having contents notifying of the sudden brake operation (S307). Accordingly, users of the terminal devices 31 to 33 can understand during driving that the sudden brake operation was performed by another vehicle. Therefore, comparing with the case where the condition of another vehicle is confirmed only visually, it is possible to achieve a safe driving.

(14) When the terminal device 31 to 33 detects a flash light operation (S303: YES), the terminal device 31 to 33 transmits voice information signifying a voice having the contents notifying of the flash light operation (S304). Accordingly, users of the terminal devices 31 to 33 may understand during driving that the flash light operation was performed by another vehicle. Accordingly, comparing with the case where the condition of another vehicle is confirmed only visually, users can confirm more easily the sign from another vehicle.

(15) When the terminal device 31 to 33 detects a blinker operation (S301: YES), the terminal device 31 to 33 transmits voice information signifying a voice having contents notifying the blinker operation (S302). Accordingly, users of the terminal devices 31 to 33 may understand during driving that the blinker operation was performed by another vehicle. Accordingly, compared with the case where the condition of another vehicle is confirmed only visually, users can predict more easily a movement of another vehicle.

(16) The terminal device 31 to 33 detects a state on a vehicle as the specific event (S401, S403, S405, S408). When the terminal device 31 to 33 detects the specific state (S401:YES, S403:YES, S405:YES, or S408:YES), the terminal device 31 to 33 transmits voice information signifying a voice having the contents notifying that the specific state was detected (S402, S404, S406, S409, S116). Accordingly, users of the terminal devices 31 to 33 may understand during driving that the specific state was detected by another vehicle.

(17) When the terminal device 31 to 33 detects an activation of the ABS (S401: YES), the terminal device 31 to 33 transmits voice information signifying a voice having the contents notifying of the ABS activation (S402). Accordingly, users of the terminal devices 31 to 33 may understand during driving that the ABS was activated in another vehicle. Therefore, it is possible to predict more easily a slippery condition, as compared with a case where the road condition is confirmed only visually.

(18) When the terminal device 31 to 33 detects a contact of the vehicle bottom surface with a road level difference and so on or a high possibility of such contact (S403: YES), the terminal device 31 to 33 transmits voice information signifying a voice having the contents notifying the possibility that the vehicle bottom surface may be scratched (S404). Accordingly, as compared with the case where the road condition is confirmed only visually, it makes it easy to predict the high possibility that the vehicle bottom surface may be scratched.

(19) When the terminal device 31 to 33 detects the side wind hitting against the vehicle (S405: YES), the terminal device 31 to 33 transmits voice information signifying a voice having the contents notifying that the vehicle has been exposed to side wind (S406). Accordingly, as compared with the case where the conditions outside the vehicle are confirmed only visually, it makes easier to predict the conditions where a vehicle may be potentially impacted by side wind.

(20) When the terminal device 31 to 33 detects a vehicle falling off or collision (S408: YES), the terminal device 31 to 33 transmits voice information signifying a voice having the contents notifying that the vehicle has fallen off or collided (S409). Accordingly, users of the terminal devices 31 to 33 may understand during driving that another vehicle has fallen off or collided. Therefore, as compared with the case where conditions of another vehicle are confirmed only visually, it is possible to achieve safe driving.

(21) Other effects as described below may be obtained.

The communication system 1 as described above includes the plurality of terminal devices 31 to 33 that can communicate mutually and the server 10 that can communicate to the respective plurality of terminal devices 31 to 33. The CPU 41 of each of the terminal devices 31 to 33 converts voice inputted by a user into voice information and transmits the voice information to the other terminal devices 31 to 33.

The CPU 41 receives voice information transmitted by the other terminal devices 31 to 33 and reproduces the voice information received. The server 10 receives voice information transmitted from the plurality of terminal devices 31 to 33, arranges in a manner that the voices respectively corresponding to the voice information do not overlap each other, and then delivers the voice information to the plurality of terminal devices 31 to 33.

In such communication system 1, the transmission contents are inputted by voice and the transmission contents from the other terminal devices 31 to 33 are reproduced by voice. Therefore, even a user behind the steeling wheel can transmit and receive safely the transmission contents such as contents that a user would like to tweet. Further in such communication system 1, it is possible to reproduce voices in a manner that the voices do not overlap when the voices are reproduced, thereby enabling making the voices listener-friendly.

Still further, in the communication system 1, when the CPU 41 receives a specific command by a user, the CPU 41 reproduces once more voice information already reproduced. Specifically, the CPU 41 may reproduce the voice information reproduced immediately prior. According to such communication system 1, voice information, which could not be caught by a user due to noise or the like, may be reproduced once more at a user's command.

Further, in the communication system 1, the terminal devices 31 to 33 are mounted on vehicles. When the CPU 41 of each of the terminal device 31 to 33 detects, along with the touch panels 61 and 62 that detect the movement of a user hand on a vehicle steering wheel, the start specifying movement to start inputting the voice by the touch panels 61 and 62, the CPU 41 starts a process to generate a voice packet. When the CPU 41 detects the end specifying movement to end inputting the voice by the touch panels 61 and 62, the CPU 41 ends the process to generate the voice packet. In such communication system 1, an operation to input a voice may be performed on the steering wheel. Accordingly, a user behind the steering wheel may input voice more safely.

In the communication system 1, the CPU 41 detects the start specifying movement and end specifying movement inputted via the touch panels 61 and 62 as user hand movements through which the user hands move in a direction opposite to the operation direction to operate a horn. In such communication system 1, it is possible to inhibit the horn beeping when the start specifying movement or end specifying movement is operated.

In the communication system 1, the server 10 produces new voice information obtained by adding, by voice, identification information to identify users into the voice information inputted by the users, and delivers the voice information produced. In such communication system 1, since the identification information to identify the user is added by voice, the user can notify other users of a user being a voice transmitting source, without telling his or her own identification information.

Further, in the communication system 1, the server 10 extracts, from the voice information, a predetermined keyword contained in the voice information prior to the voice information reproduction and replaces the keyword contained in the voice information with a voice for another word or a predetermined sound. According to such communication system 1, inappropriate words for delivery (indecent words, words implying personal names, uncivilized words, and others) may be registered as keywords and may be replaced with words or sounds that may be delivered.

In the communication system 1, the CPU 41 of each of the terminal devices 31 to 33 obtains its location information, makes the location information correspond to the voice information to be transmitted from its terminal device 31 to 33, transmits to the other terminal device 31 to 33, and obtains location information transmitted from the other terminal device 31 to 33. The CPU 41 of each of the terminal devices 31 to 33 controls a volume of sound outputted when a voice is reproduced, in response to a positional relationship between a position of the terminal device 31 to 33 corresponding to the reproduced voice and the position of its terminal device 31 to 33.

Especially, the CPU 41 controls to reduce a sound volume in accordance with the increase in the distance to the other terminal device 31 to 33. Further, when the CPU 41 outputs voices from a plurality of speakers, the CPU 41 controls to increase a volume of sound outputted from the side that is nearer the other terminal device 31 to 33 in relation to the user position, in response to the direction where the other terminal device 31 to 33 is located relative to its terminal device 31 to 33.

According to such communication system 1, a sound volume is controlled in response to the positional relationship between a position of the terminal device 31 to 33 corresponding to the reproduced voice and the position of its terminal device 31 to 33. Therefore, a user who listens to the voice can sense the positional relationship between the other terminal device 31 to 33 and its own terminal device 31 to 33.

Further, according to the communication system 1, the server 10 converts the voice information into characters and outputs the converted characters on a display. According to such communication system 1, users may confirm by characters information the users missed though voice.

Still further, according to the communication system 1, the CPU 41 of each of the terminal devices 31 to 33 transmits information indicating vehicle conditions and/or user driving operations (operating conditions of lights, wipers, televisions, radios, etc., vehicle running conditions such as travel speed, travel direction, etc., control conditions such as values detected by vehicle sensors, presence or absence of malfunctions, etc.), in combination with the voice. In such communication system 1, information indicating user driving operations may be transmitted to the other terminal device 31 to 33.

Still further, according to the communication system 1, advertisements are aired by voice in response to the position of the terminal device 31 to 33. The server 10 inserts the advertisement contents and transmits the advertisement to the terminal device 31 to 33 that reproduces the voice information. According to such communication system 1, it is possible to offer a business model that generates revenue from advertising.

Still further, according to the communication system 1, the delivery mode, in which a communication partner is an unspecified large number, and the interactive mode, in which communication is carried on with a specific communication partner, are able to be switched. According to such communication system 1, a user can enjoy communicating with a specific partner.

Still further, according to the communication system 1, the server 10 determines a user's emotion or polite way of speaking when the user inputs a voice, by detecting, from voice information, an amplitude of the input level or a politeness expression contained in the voice. As a result, it may be configured not to deliver a user voice that is based upon an excited emotion or is not a polite way of speaking. According to such communication system 1, it is possible to exclude a user utterance that may lead to some quarrel.

Still further, according to the communication system 1, the server 10 notifies a user speaking ill of others, a user getting too excited, or a user speaking impolitely, of their improper words. In this case, the server 10 determines based upon whether any words registered as abusive keywords are contained in the voice information. According to such communication system 1, it is possible to encourage the user, who uttered an improper word, not to utter improper words.

S102 corresponds to an example of a process as an input device. S114, S1202, S1204, and S1205 each correspond to an example of a process as an obtaining device. S116 corresponds to an example of a process as a transmitting device. S811 corresponds to an example of a process as a reproducing device.

Other Embodiments

A mode to carry out the present invention is not limited to the above embodiment, and any modes may be adopted without departing from the technical scope of the present invention.

(1) According to the above-described embodiment, the server 10 performs an extracting process to extract, from among a plurality of voice information accumulated, voice information corresponding to the terminal device 31 to 33 that reproduces a voice (S1302 to S1312), but it should not be limited hereto. For example, the terminal device 31 to 33 that reproduces a voice may perform a part or entirety of such extracting process. For example, the server 10 may transmit voice information to the terminal device 31 to 33 in a manner that extra voice information that is not possibly reproduced by the terminal device 31 to 33, may be contained, and the terminal device 31 to 33 extracts voice information to be reproduced from among the voice information received by the terminal device 31 to 33 (discards unnecessary voice information). The voice information transmission from the server 10 to the terminal device 31 to 33 may be performed at a request from the terminal device 31 to 33 or with our without the request.

(2) According to the embodiment, with respect to the respective voice information being the transmission candidates, the server 10 determines whether the contents of the voice information being the transmission candidate overlap the contents of the other voice information (S1311). When the server 10 determines that the contents overlap (S1311: YES), the server 10 resolves that the contents overlap (S1312). Accordingly, a phenomenon that similar utterances are repetitively reproduced is suppressed. From a different angle, the more number of voice information of which the contents overlap is, it is considered that the contents are highly credible. Accordingly, it may be made a condition to reproduce a voice having the contents that there is a certain number or more of voice information of which the contents overlap.

Figure 21A:
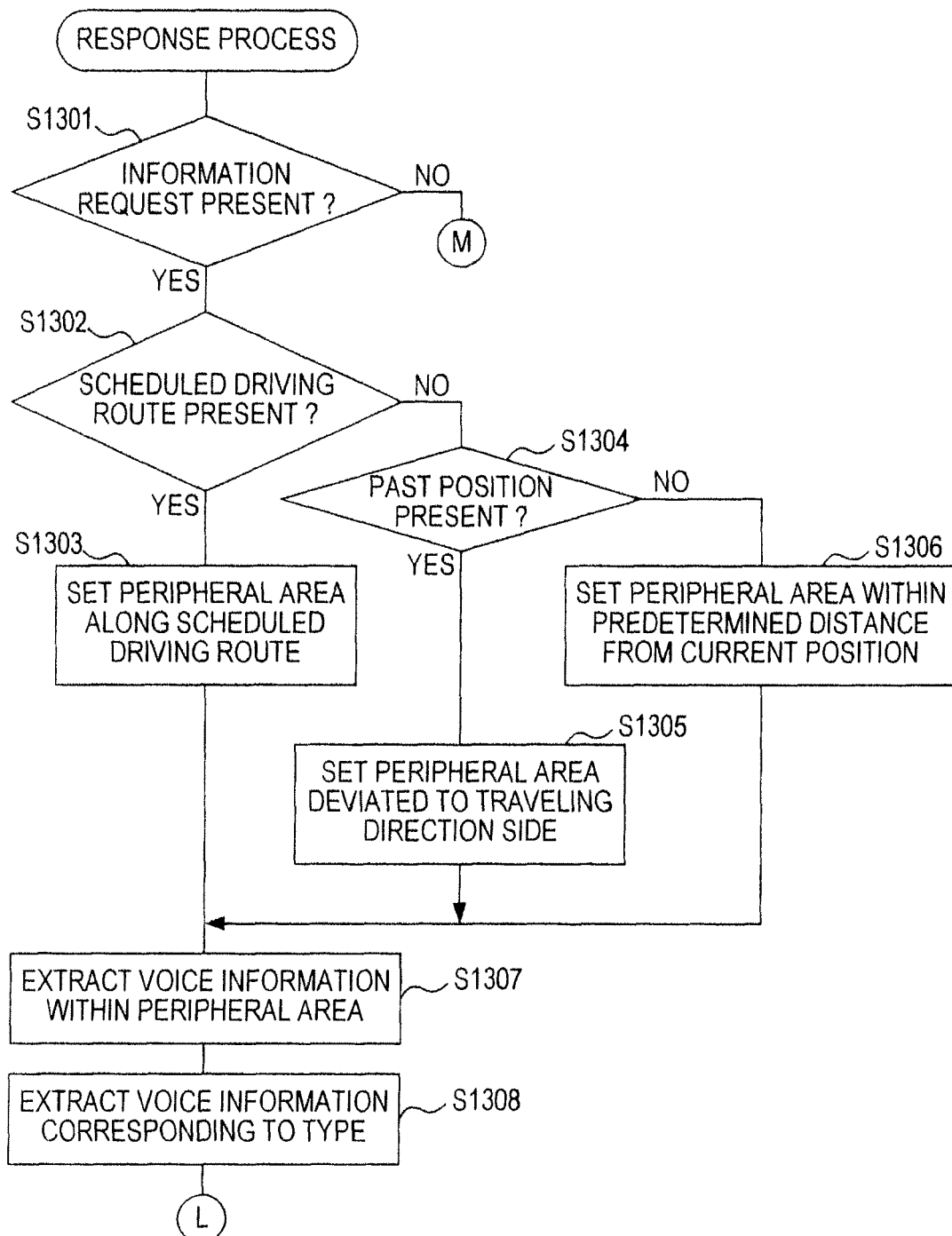
FIG. 21A is a flowchart illustrating a part of a response process according to a modified example.
Figure 21B:
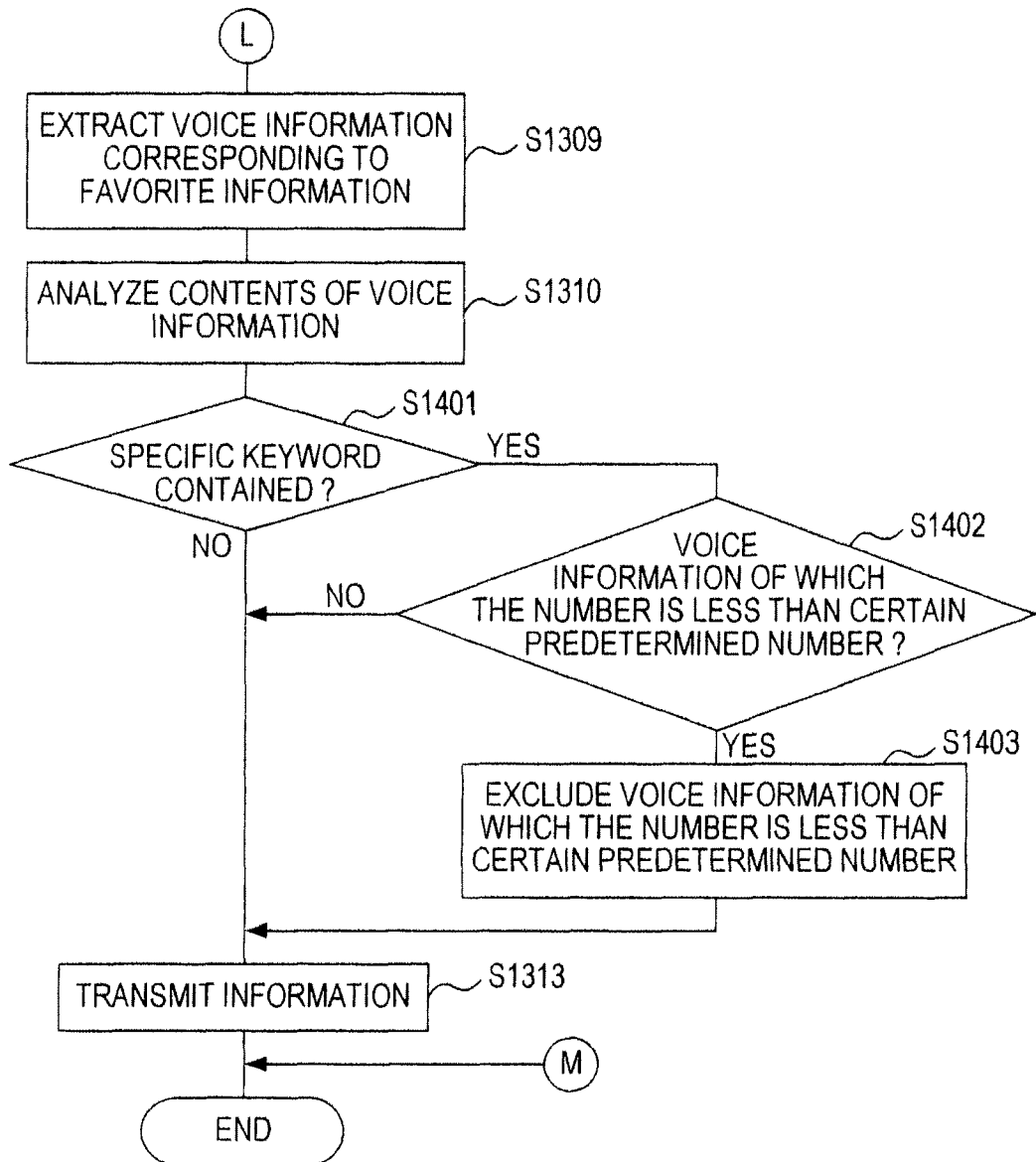
FIG. 21B is a flowchart illustrating the remaining part of the response process according to the modified example.
Figure 22A:
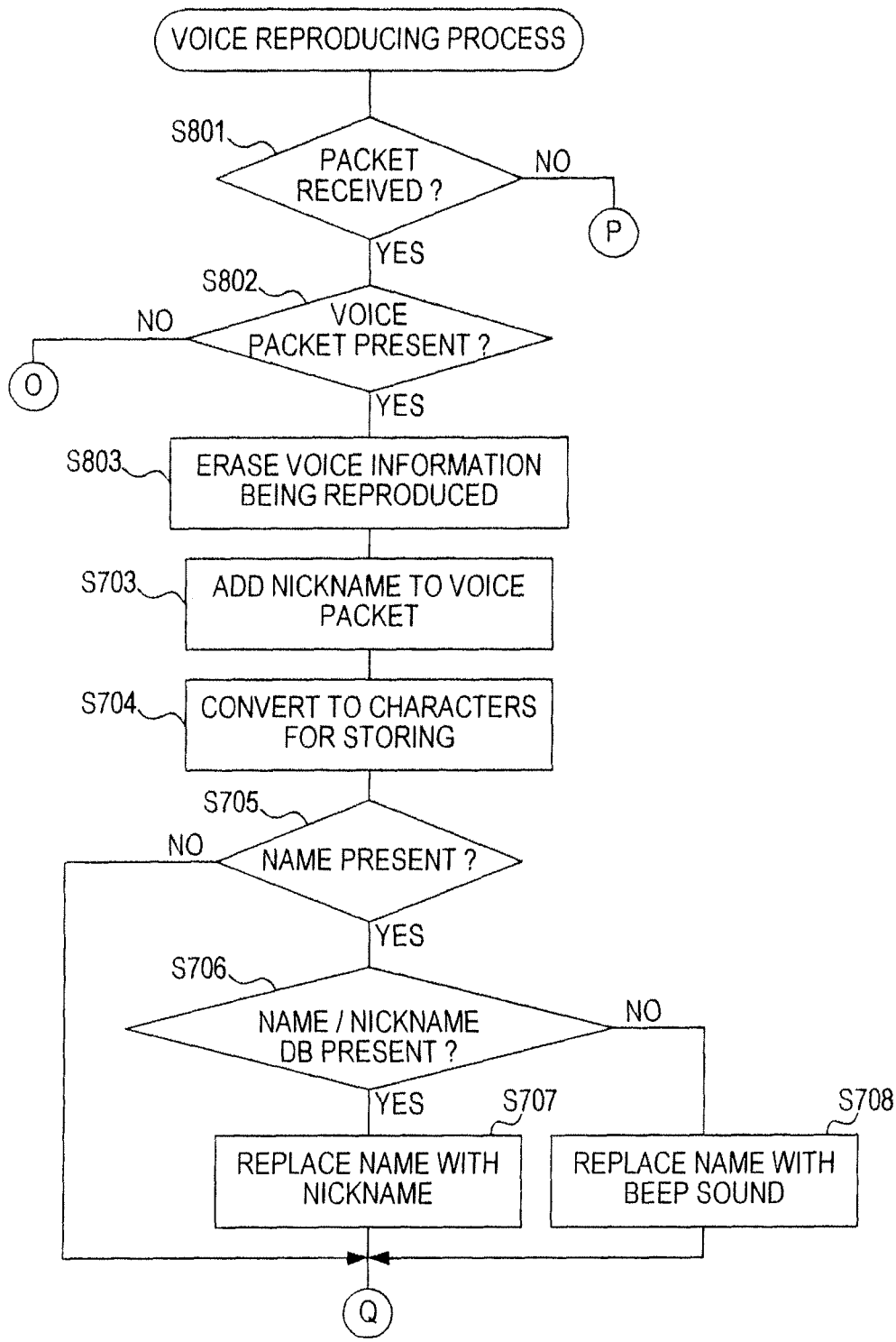
FIG. 22A is a flowchart illustrating a part of a voice reproducing process according to the modified example.
Figure 22B:
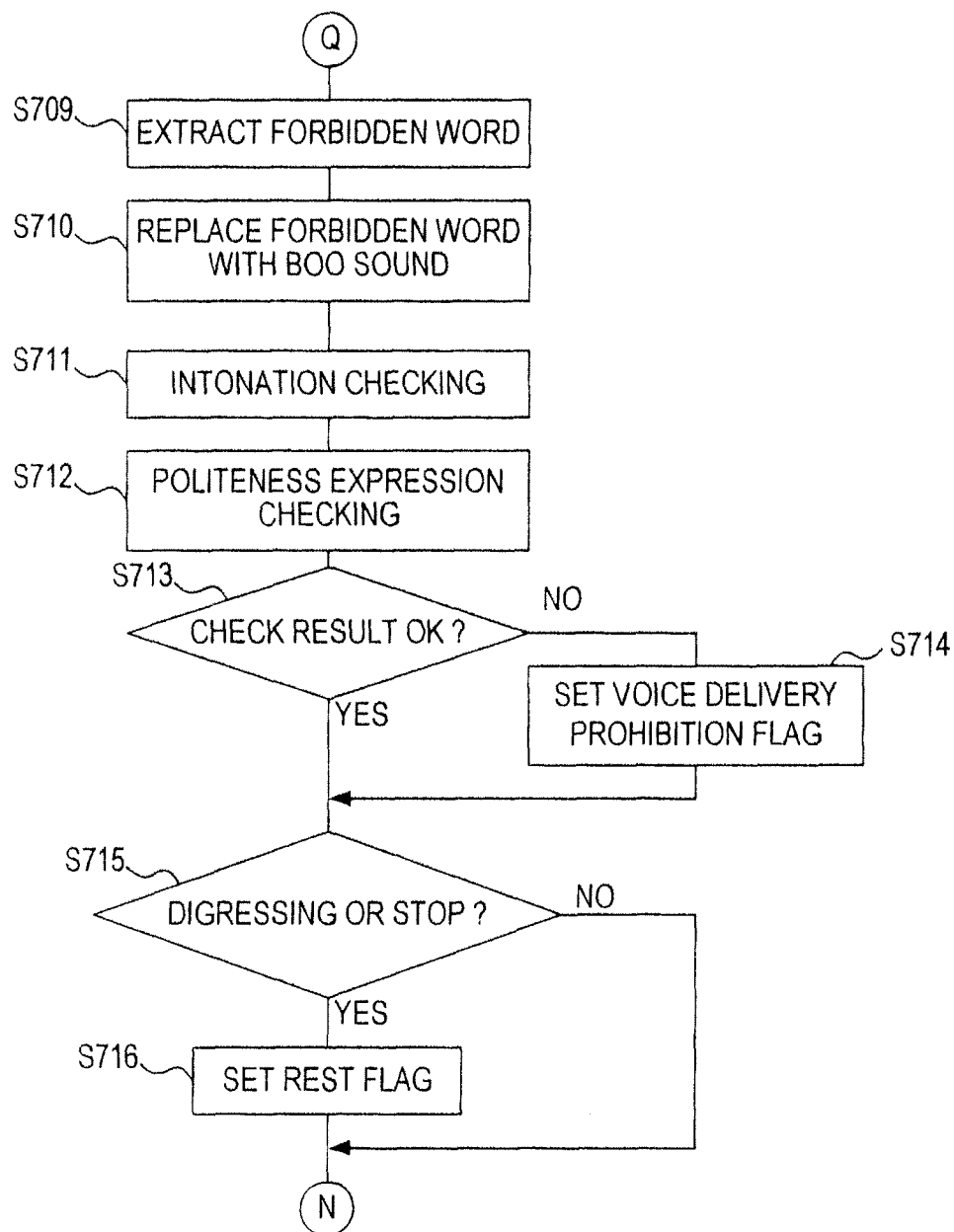
FIG. 22B is a flowchart illustrating another part of the voice reproducing process according to the modified example.
Figure 22D:
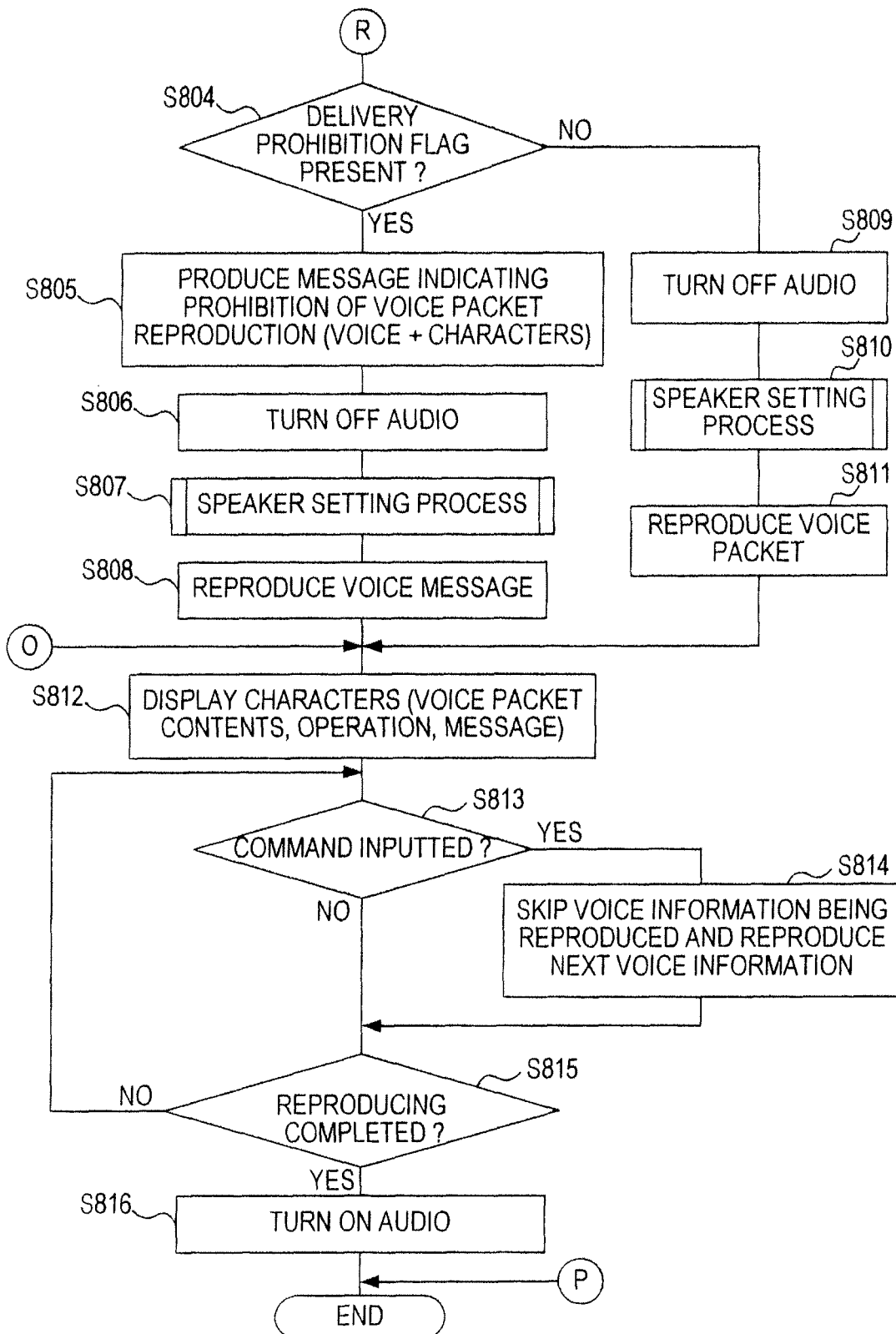
FIG. 22D is a flowchart illustrating the remaining part of the voice reproducing process according to the modified example.

For example, a response process illustrated in FIGS. 21A and 21B is a process, in which S1401 to S1403 are processes replaced from S1311 to S1312 of the response process in FIGS. 17A and 17B as described above. That is, in the response process in FIGS. 21A and 21B, the CPU 11 of the server 10 determines whether a predetermined specific keyword, such as "accident", "lane restriction", and so on, is contained in each of the voice information being the transmission candidates (S1401).

When the CPU 11 determines the presence of the voice information having specific keywords, among the voice information being the transmission candidates (S1401: YES), the CPU 11 determines whether the number of voice information having the specific keywords and having the same (overlapping) contents is less than the certain predetermined number (e.g., three) (S1402). When the CPU 11 determines that the number of voice information having the same contents is less than the certain predetermined number (S1402: YES), the voice information having the contents are excluded from the voice information being the transmission candidates (S1403). Subsequently, the CPU 11 transmits the voice information being the transmission candidate to the terminal device 31 to 33 being the transmitting source of the information request (S1313). The response process is then terminated.

Meanwhile, when the CPU 11 determines the absence of the voice information having specific keywords among the voice information being the transmission candidates (S1401: NO) or when the CPU 11 determines that the number of voice information having the same contents is not less than the certain predetermined number (S1402: NO), the process directly proceeds to S1313. The CPU 11 transmits the voice information being the transmission candidates to the terminal device 31 to 33 being the transmitting source of the information request (S1313). The response process is then terminated.

That is, according to the response process illustrated in FIGS. 21A and 21B, the voice information having the same contents is not transmitted to the terminal device 31 to 33 until they are accumulated at the certain predetermined number or more. Making a condition that the number of the voice information having the same contents reaches the certain predetermined number, the voice information having the same contents is transmitted to the terminal device 31 to 33. Accordingly, the terminal device 31 to 33 is restrained from reproducing a voice having low-credible contents, such as false information.

In the example illustrated in FIGS. 21A and 21B, the voice information having a specific keyword is the subject, and the presence of the certain predetermined number or more voice information having the same contents is the condition to transmit the voice information, but it should not be limited hereto. For example, with or without a specific keyword in the voice information, it may be made as a condition for transmitting whether the number of voice information having the same contents is a certain predetermined number or more, regarding all the voice information being the transmission candidates. Further, regarding the determination of whether there is a certain number of voice having the same contents, even when there is a plurality of voice information sent from the same sending source, each of the plurality of voice information may be counted as one (not counted as plural). In this case, if the same user utters voices having the same contents more than once, it is possible to restrain that a voice having low-credible contents is reproduced by other users' terminal devices 31 to 33.

(3) According to the above-described embodiment, a process is performed, by which the terminal device 31 to 33 that transmits voice information converts a recorded voice to a synthetic voice (S107), but it should not be limited hereto. For example, the server 10 or a terminal device 31 to 33 that reproduces a voice may perform a part or entirety of such conversion process.

(4) According to the above-described embodiment, the terminal device 31 to 33 performs the request process (FIG. 16) every predetermined period of time, but it should not be limited hereto. The request process may be performed at another predetermined timing, for example, every time when a vehicle travels a predetermined distance, when a user performs a request operation, when a specified time comes, when a vehicle passes a specified point, when a vehicle goes out of the peripheral area, and so on.

(5) According to the above-described embodiment, voice information located within the peripheral area is extracted for reproduction, but it should not be limited hereto. For example, an extended area comprising the peripheral area (greater than the peripheral area) is set, voice information within the extended area is extracted, and voice information within the peripheral area among the extracted voice information may be extracted for reproduction. Specifically, voice information of which an utterance position is within the extended area is extracted in S1307 of the above-described embodiment. The terminal device 31 to 33 stores (caches) voice information that is located in the extended area and is transmitted from the server 10. The terminal device 31 to 33 then extracts voice information of which an utterance position is located in the peripheral area when a voice representing voice information is reproduced. Accordingly, even when the peripheral area based upon the current position changes in association with a vehicle travel, if a peripheral area after the change is covered in the extended area obtained when the voice information was received, it is possible to reproduce a voice representing voice information corresponding to the peripheral area.

(6) According to the above-described embodiment, a peripheral area is set based upon a vehicle current position (actual position), but it should not be limited hereto. It may be accepted to obtain location information other than the current position and to set a peripheral area with reference to the location information obtained. Specifically, location information set (inputted) by a user may be obtained. Accordingly, for example, when a peripheral area is set based upon a destination, voice information set near the destination may be confirmed in advance at a place far away from the destination.

(7) According to the above-described embodiment, the terminal devices 31 to 33 configured as onboard devices mounted on vehicles are illustrated as a terminal device, but it should not be limited hereto. For example, the terminal device may be a device that is portable by a user and is usable in a vehicle (cell phones, and so forth). Further, a part of the structure of the terminal device (e.g., position-detecting structure, voice-inputting structure, voice-reproducing structure, and so forth) may be shared by a device mounted on a vehicle or not.

(8) According to the above-described embodiment, a configuration is illustrated, in which, from among voice information transmitted from the other terminal device 31 to 33 to the server 10, voice representing voice information of which an utterance position is located within a peripheral area set based upon a current position is reproduced, but it should not be limited hereto. Voice information may be extracted and reproduced irrespective of location information.

(9) Information that the terminal device inputs from the user should not be limited to a voice uttered by the voice and may be character information inputted by the user, for example. That is, the terminal device may input the character information from the user in substitution for the voice uttered by the user (or along with the voice). In this case, the terminal device may display the character information so that the user can confirm visually. Further, the terminal device may convert the character information to a synthetic voice for reproduction.

(10) The above-described embodiment is simply an example of a mode to which the present invention is applied. The present invention may be achieved in various modes, such as system, apparatus, method, program, recording medium recording, and so on.

(11) The following alternatives are also applicable.

For example, according to the communication system 1, the contents to be added as identification information (e.g., real name, first nickname, second nickname, and so on) may be changed in response to a communication mode. For example, information to identify oneself may be exchanged in advance, and the identification information may be changed based upon whether a communication partner is a partner pre-registered.

According to the above-described embodiment, keywords may be replaced with another word or something in any events. However, a process to replace keywords with another word or the like does not have to be performed for some conditions, such as some communication partners, some communication modes, and so on. It is because when communicating with a specific partner, it is different from the case to deliver to the public and such process does not have to be performed.

For a meaningless word unique to colloquial language, such as "Uh" or "Well", voice information omitting this word may be produced. In this case, it is possible to shorten a voice information reproducing duration depending on an amount of the omission.

Further, according to the above-described embodiment, the CPU 41 of each of the terminal devices 31 to 33 outputs, by characters, information of information indicating vehicle conditions and/or user driving operations, but such information may be outputted by voice. Still further, various information, such as traffic congestion information and so on, may be produced based upon information obtained by the other terminal device 31 to 33, and the information produced may be outputted.

Still further, according to the communication system 1, a configuration, in which each of the terminal devices 31 to 33 exchanges voice information directly, and a configuration, in which each of the terminal devices 31 to 33 exchanges voice information via the server 10, may be switched depending on a predetermined condition (for example, a distance to the base station connected to the server 10, a communication state among the terminal devices 31 to 33, user settings, and so on).

According to the above-described embodiment, advertisements are aired by voice in response to the position of the terminal device 31 to 33. However, advertisements may be aired by voice every predetermined time or every time when a predetermined amount of voice information is reproduced. Further, advertisement contents may be transmitted from the terminal device 31 to 33 being an advertiser to the other terminal devices 31 to 33. In this case, a user may be allowed to talk (communicate) with the advertiser by inputting a predetermined operation to his or her own terminal device 31 to 33 or the user of the terminal device 31 to 33 may be guided to the store of the advertiser.

Still further, according to the embodiment, a mode to communicate with a plurality of specific communication partners may be set. For example, when the location information is exchanged, the terminal devices 31 to 33 within a predetermined distance may be set as the communication partners or specific users (preceding vehicles, on coming vehicles, etc. (specified by image-capturing of vehicle license plates by cameras, or by GPSs)) or users falling into a preset group may be set as the communication partners. The communication partners may be changed by setting (communication modes may be changed by setting).

Still further, when the terminal devices 31 to 33 are mounted on vehicles, the terminal device 31 to 33 moving on the same road and in the same direction may be set as a communication partner, or the terminal device 31 to 33 having a corresponding vehicle behavior (removed from the communication partner when the vehicle digresses from the road) may be set as a communication partner.

Still further, it may be configured so that the other user is specified, favorites or registration cancellation maybe preset, and a user is allowed to a favorite partner to communicate. In this case, voice information should be transmitted to a predetermined partner only by transmitting communication partner information identifying a communication partner when a voice is transmitted or by registering communication partner information in a server when the server is present.

Still further, respective directions may be made to correspond to switches such as a plurality of buttons. When a user specifies by the switch a direction where communication partners exist, users existing in the direction only may be set to the communication partners.

Still further, according to the communication system 1, voice information is configured to be exchanged. However, information consisting of characters may be obtained, converted to a voice to be reproduced. Also when a voice is transmitted, the voice may be converted into characters to be fed, and the characters after conversion may be restored to a voice to be reproduced. With this configuration, it is possible to reduce an amount of data to be fed via communication.

Still further, with such configuration where the data is fed by characters, the data may be translated into a language, which results in the smallest data amount from among a plurality of predetermined languages, and then be fed.

A part of the function of the server 10 according to the above embodiment may be performed by the terminal devices 31 to 33. For example, when there is a plurality of voice information which the CPU 41 of the terminal device 31 to 33 has not completed reproduction thereof, the CPU 41 of the terminal device 31 to 33 may first arrange the respective voice information so that voices corresponding to the respective voice information do not overlap, and then may reproduce the voice information. The CPU 41 may produce new voice information obtained by adding, by voice, identification information to identify a user into the voice information inputted by the user and may transmit the voice information produced.

Specifically, a part of the voice delivering process may be performed in the voice transmitting process or the voice reproducing process. For example, when a part of the voice delivering process is performed in the voice reproducing process, as illustrated in FIGS. 22A to 22D, the processes in S703 to S722 (not inclusive of S717) of the voice delivering process should be performed between S802 and S804 of the voice reproducing process.

With such communication system, it is possible to reproduce voices so that the voices do not overlap when the voices are reproduced, thereby enabling to make the voices listener-friendly. Even with such communication system, it is possible to add, by voice, identification information to identify a user, the user can notify other users of a user being a voice transmitting source, without telling his or her own identification information.

According to the above-described embodiment, voices are prohibited from overlapping and being reproduced; however a part of the voices may be allowed to overlap and to be reproduced. In this case, the last several seconds of an earlier voice and the first several seconds of a latter voice may be allowed to overlap each other. Here, a fade-out effect to gradually reduce a sound volume at the end of the earlier voice and a fade-in effect to gradually increase a voice at the beginning of the latter voice may be combined.

Further, it may determine, based upon presence or absence of a user uttering voice, whether the user is dozing at the wheel. In order to achieve this configuration, for example, the drowsy driving determining process illustrated in FIG. 23 may be performed.

The drowsy driving determining process is a process to be performed by the terminal device 31 to 33 concurrently with the voice transmitting process. The drowsy driving determining process is a process to sound an alarm or to perform a vehicle control such as vehicle halt/stop in the event where a user does not utter for a predetermined period of time or a user's consciousness level is determined low even when the user utters. Specifically, as illustrated in FIG. 23, a time elapsed from a user last utterance is counted (S1401).

It is determined whether a first reference period of time (e.g., approximately ten minutes) has elapsed since the user last utterance (S1402). When the first reference period of time has not elapsed (S1402: NO), the drowsy driving determining process is terminated.

When the first reference period of time has elapsed (S1402: YES), the CPU 41 makes an inquiry to the user (S1403). In this process, the CPU 41 inquires of the user to encourage utterance in order to confirm a user consciousness level. Accordingly, such inquiry may be a direct inquiry, such as "Are you awake?" and so on, or an indirect inquiry, such as "Please tell me the current time." and so on.

Subsequently, the CPU 41 determines whether there is a user response to such inquiry (S1404). When there is a user response to the inquiry (S1404: YES), the CPU 41 determines a level of the user response (S1405).

The level of the user response herein refers to items of which the levels (sound volume, voice recognition precision) are lowered as the user gets sleepy, such as loudness, smoothness in speaking, and so on. In this process, the CPU 41 determines by comparing any of these items with a predetermined threshold value.

When the level of the user response is high enough (S1405: YES), the drowsy driving determining process is terminated. When the level of the user response is not sufficient (S1405: NO) or when there is no user response to the inquiry (S1404: NO), the CPU 41 determines whether a second reference period of time (e.g., approximately ten minutes and ten seconds), which is set equal to or greater than the value of the aforementioned first reference period of time, has elapsed since the user last utterance (S1406).

When the second reference period of time has not elapsed (S1406: NO), the process returns to S1403. When the second reference period of time has elapsed (S1406: YES), the CPU 41 sounds an alarm via the speakers 5 53 (S1407).

Subsequently, the CPU 41 determines a presence or absence of a response to the alarm (for example, a voice such as "Wow!" or an operation via the input portion 45 to cancel the alarm) (S1408). When the CPU 41 determines the presence of the response to the alarm (S1408: YES), the CPU 41 determines a level of a user response in the same manner as S1405 (S1409). When the operation via the input portion 45 is inputted, the CPU 41 determines that the level of the user response is sufficient.

When the level of the user response is sufficiently high (S1409: YES), the drowsy driving determining process is terminated. When the level of the user response is not sufficient (S1409: NO) or when there is no user response to the inquiry in S1408 (S1408: NO), the CPU 41 determines whether a third reference period of time (e.g., approximately ten minutes and thirty seconds), which is set equal to or greater than the value of the aforementioned second reference period of time, has elapsed since the user last utterance (S1410).

When the third reference period of time has not elapsed (S1410: NO), the process returns to S1407. When the third reference period of time has elapsed (S1410: YES), the CPU 41 performs a vehicle control, such as stopping the vehicle (S1411), and the drowsy driving determining process is terminated.

Implementing such process allows inhibiting a user's (driver's) dozing.

Further, when an advertisement is inserted by voice (S720) or when a voice is also displayed by characters (S812), further additional character information may be shown on a display such as the navigation device 48 and so OR.

Figure 24:
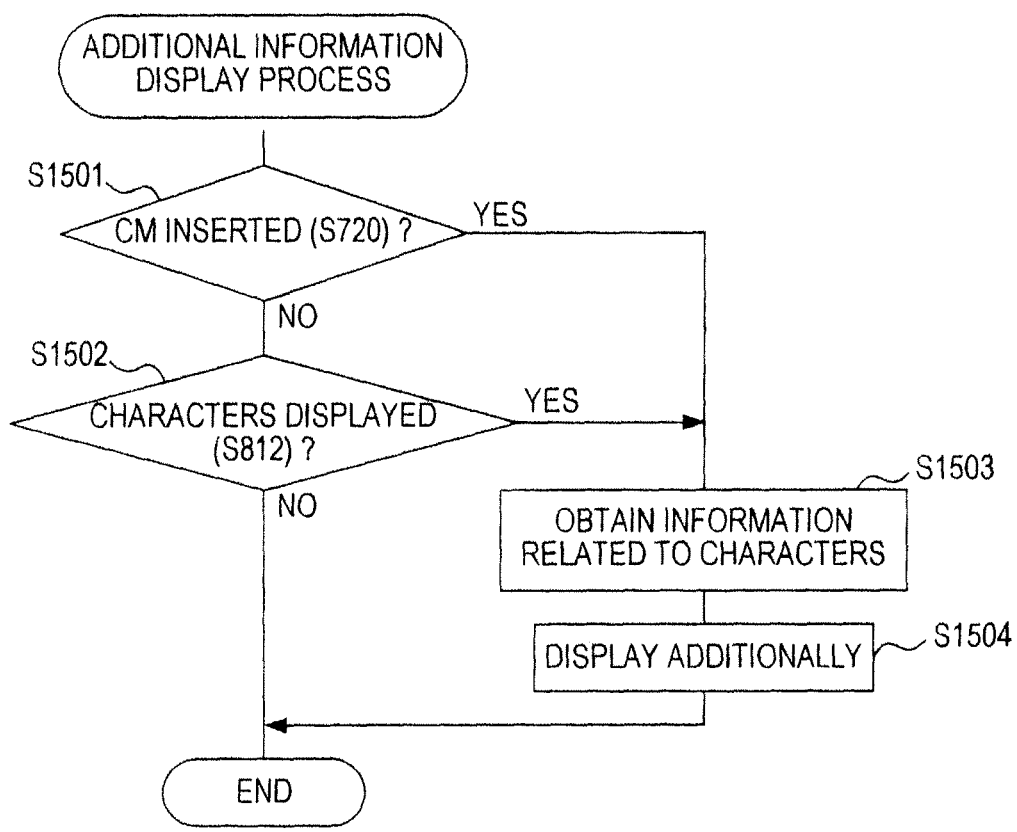
FIG. 24 is a flowchart illustrating an additional information display process.

In order to achieve such configuration, for example, an additional information display process illustrated in FIG. 24 may be performed. The additional information display process is a process to be performed by the server 10 concurrently with the voice delivering process.

In the additional information display process, as illustrated in FIG. 24, the server 10 first determines whether an advertisement (CM) is inserted in the voice delivering process (S1501) and determines whether characters are displayed (S1502). When an advertisement is inserted (S1501: YES) or when characters are displayed (S1502: YES), the server 10 obtains information related to characters to be displayed (S1503).

Here, information related to characters includes, for example, information on the advertisement or area corresponding to the character string (keyword) to be displayed, information to explain information related to the character string, information made to correspond to this character string, and so on. Such information may be obtained from inside the server 10 or from outside the server 10 (on the internet and so on).

When the information related to characters is obtained, the server 10 displays such information as characters or an image on the display (S1504), and the additional information display process is terminated.

When no advertisement is inserted in S1501 and no characters are displayed in S1502 (S1501: NO and S1502: NO), the additional information display process is terminated.

According to such configuration, it is possible not only to display a voice as characters but also to display relevant information.

A display to show character information should not be limited to the display of the navigation device 48 and may be any display such as an in-vehicle head-up display and so on.

The invention claimed is:

1. A communication system comprising:
   a plurality of terminal devices; and
   a server that is capable of communicating with each of the plurality of terminal devices;
   wherein the each of the plurality of terminal devices comprises:
      a voice input conversion device that, when a user inputs a voice, converts the voice into voice information;
      a voice information transmitting device that obtains first location information indicating a current location of a navigation device from the navigation device, adds the first location information to the voice information, and transmits the voice information to the server;
      a first voice information receiving device that receives voice information transmitted from the server;
      a voice reproducing device that reproduces a voice based on the voice information received; and
      an information request transmission device that obtains second location information indicating at least the current location of the navigation device from the navigation device and transmits an information request including the second location information to the server, and
   wherein the server comprises:
      a second voice information receiving device that receives the voice information transmitted from the each of the plurality of terminal devices;
      an accumulating device that accumulates the voice information received by the second voice information receiving device;
      an information request receiving device that receives the information request transmitted from the each of the plurality of terminal devices;
      a peripheral area setting device that sets a peripheral area of the navigation device based on the second location information included in the information request received by the information request receiving device;
      an extraction device that extracts voice information transmitted from a location included in the peripheral area set by the peripheral area setting device based on the first location information; and
      a delivering device that delivers the voice information extracted by the extraction device to a terminal device corresponding to the information request.

2. The communication system according to claim 1, wherein the voice reproducing device reproduces once again the voice already reproduced at a specific command by the user.

3. The communication system according to claim 1, wherein the second location information indicates a past location of the navigation device in addition to the current location of the navigation device.

4. The communication system according to claim 3, wherein the peripheral area setting device sets an area in a traveling direction side of the navigation device as the peripheral area.

5. The communication system according to claim 1, wherein the second location information indicates a destination and a route to the destination of the navigation device in addition to the current location of the navigation device.

6. The communication system according to claim 5, wherein the peripheral area setting device sets an area along a scheduled traveling route of the navigation device as the peripheral area.

* * * * *